(12) United States Patent
Gavaudan et al.

(10) Patent No.: US 11,126,659 B2
(45) Date of Patent: Sep. 21, 2021

(54) SYSTEM AND METHOD FOR PROVIDING A GRAPH PROTOCOL FOR FORMING A DECENTRALIZED AND DISTRIBUTED GRAPH DATABASE

(71) Applicant: Graphen, Inc., New York, NY (US)

(72) Inventors: Matthieu L. Gavaudan, New York, NY (US); Peiqi Jin, New York, NY (US); Yang Yang, New York, NY (US); Ching-Yung Lin, Scarsdale, NY (US); Hal J. Cooper, New York, NY (US)

(73) Assignee: Graphen, Inc., New York, NY (US)

( * ) Notice: Subject to any disclaimer, the term of this patent is extended or adjusted under 35 U.S.C. 154(b) by 136 days.

(21) Appl. No.: 16/231,831

(22) Filed: Dec. 24, 2018

(65) Prior Publication Data
US 2020/0201910 A1    Jun. 25, 2020

(51) Int. Cl.
*G06F 15/16*    (2006.01)
*G06F 16/901*    (2019.01)
(Continued)

(52) U.S. Cl.
CPC ........ *G06F 16/9024* (2019.01); *G06F 16/907* (2019.01); *G06F 16/90335* (2019.01);
(Continued)

(58) Field of Classification Search
None
See application file for complete search history.

(56) References Cited

U.S. PATENT DOCUMENTS 8,204,856 B2    6/2012   Meyer et al.
2006/0242155 A1*  10/2006  Moore ............... H04L 67/104
(Continued)

OTHER PUBLICATIONS

Hausheer, et al. Towards a Market Managed Peer-to-Peer File Sharing System Using Token-based Accounting and Distributed Pricing. TIK Report No. 179, ETH Zurich Research Collection, Aug. 2003. (Hausheer) (Year: 2003).*

(Continued)

*Primary Examiner* — Alex Gofman
*Assistant Examiner* — Shelly X Qian
(74) *Attorney, Agent, or Firm* — Akerman LLP; Mammen (Roy) P. Zachariah, Jr.

(57) ABSTRACT

A system for providing a graph protocol for forming a decentralized and distributed graph database is disclosed. The system involves receiving, from a device, a bid request to generate a graph on a graph protocol network via the graph protocol. A plurality of masternodes in the system may transmit ask requests associated with providing storage and computation power to service the bid request. If the system determines that the requirements of the bid request match or correlate with the requirements of the ask request, the system may select any masternodes having matching or correlating ask requests to service the ask request. The system may then arrange the masternodes into a unique artificially-intelligent router of the graph protocol network. The system may then proceed to generate the graph on the graph protocol network by utilizing the masternodes of the router and may process any queries associated with the generated graph.

22 Claims, 12 Drawing Sheets

(51) Int. Cl.
*G06F 16/907* (2019.01)
*G06Q 20/38* (2012.01)
*H04L 9/06* (2006.01)
*G06F 16/903* (2019.01)

(52) U.S. Cl.
CPC ....... *G06Q 20/3823* (2013.01); *H04L 9/0618* (2013.01); *H04L 2209/38* (2013.01)

(56) References Cited

U.S. PATENT DOCUMENTS

| | | | |
|---|---|---|---|
| 2012/0209886 A1* | 8/2012 | Henderson | G06F 16/211 707/798 |
| 2013/0204894 A1 | 8/2013 | Faith et al. | |
| 2015/0089399 A1* | 3/2015 | Megill | G06Q 30/0203 715/753 |
| 2016/0283920 A1 | 9/2016 | Fisher et al. | |
| 2016/0292672 A1 | 10/2016 | Fay et al. | |
| 2017/0019475 A1 | 1/2017 | Metz et al. | |
| 2018/0039710 A1* | 2/2018 | Chen | G06F 16/9024 |
| 2018/0115428 A1* | 4/2018 | Lysenko | H04L 9/3247 |

OTHER PUBLICATIONS

World Intellectual Property Organization, "International Search Report and Written Opinion," issued in International Application Serial No. PCT/US2019/068309 dated Mar. 3, 2020, document of 8 pages.

* cited by examiner

SYSTEM AND METHOD FOR PROVIDING A GRAPH PROTOCOL FOR FORMING A DECENTRALIZED AND DISTRIBUTED GRAPH DATABASE

CROSS-REFERENCE TO RELATED APPLICATIONS

The present application is related to U.S. Provisional Patent Application No. 62/741,399, entitled "System and Method for Providing an Artificially-Intelligent Graph Database, and filed on Oct. 4, 2018, the entirety of which is incorporated by reference.

FIELD OF THE INVENTION

The present application relates to computing technologies, graph database technologies, distributed ledger technologies, blockchain technologies, machine learning technologies, artificial intelligence technologies, software optimization technologies, and more particularly, to a system and method for providing a graph protocol for forming a decentralized and distributed graph database.

BACKGROUND

In today's technologically-driven society, users and businesses are increasingly relying on computing and database systems and technologies to facilitate and provide various types of services. For example, users and businesses have employed the use of graph databases comprised of vertices that represent entities, such as people, places, objects, or relevant pieces of data, and edges, which represent the relationship between two vertices to understand the relationships between the various entities and the transactions occurring between them. As another example, distributed ledger technologies have provided technological innovations in the distributed and decentralized computing industries. In particular, Blockchains and directed acyclic graphs are two of the best known distributed ledger technologies, which have gained mainstream attention due to their applications in the cryptocurrency space. Nevertheless, their true value proposition over current database systems and other information repository solutions are their security, transparency, and decentralization. That being said, there are inadequacies associated with current technologies. For example, issues arise in currently existing graph database enterprise solutions and ones presented by existing distributed ledger technologies, such as Blockchains and directed acyclic graphs.

With regard to graph database enterprise solutions, there are numerous fundamental flaws. A first and important flaw is security. While data may be replicated across two, three, or ten datacenters across the world, it still leaves a single point of failure, namely the company hosting the data. The advent of cloud computing has led companies to store data in an increasingly centralized manner, thereby signaling hackers precisely where all of the important information is being stored. As a result, destroying or obtaining access to data is as easy as hacking the company that hosts the data on its servers. Another flaw relates to data and knowledge sharing. Within this particular flaw there exist two sub-problems, namely censorship resistance and incentivization. Enterprise solutions are still being offered by companies under the control of larger governmental entities that can opt to filter the data to suit their agendas. Incentives for individuals to share their data or domain expertise are difficult to put into practice, especially without the use of digital assets. This issue is exacerbated when the data and/or knowledge collected is then used by a company for profit. A third flaw is cost. Scaling a graph database is extremely storage and computationally expensive. Many businesses and individuals have to resort to using cloud services offered by big companies. Since those companies are not obligated in any way to have price transparency, they can increase their prices with their competition and/or shareholder desires. Furthermore, similarly to the second flaw, for companies or individuals collaborating on expanding a single database, sharing resources such as costs, storage, or computational power is extremely inconvenient.

On the other hand, existing distributed ledger technologies are not perfect either, and, in fact, present a significant amount of problems of their own. For example, a first and most obvious problem is accessibility. Blockchains and directed acyclic graphs are, fundamentally, simply decentralized immutable databases. That being said, manipulating data within these so called databases has never been more difficult. The only existing solutions are software applications that offer very limited graphical user interfaces for querying the contents of a digital wallet or a contract. This problem has also led to the rise of third party blockchain analysis companies whose job entirely consists of querying the blockchain in ways that should be trivial for normal graphs or relational databases. Another problem is the current distributed ledger technologies' architecture. This is a much deeper flaw that may require the complete revisal of the structure of directed acyclic graphs and Blockchains. Blockchains and directed acyclic graphs were built with transaction storage in mind, and not anything heavier. As a result of that, they are only able to contain small amounts of data without scaling node resources and becoming centralized. Notably, it currently costs millions of dollars to store just one gigabyte worth of data on Ethereum or Bitcoin. Furthermore, blocks are created irregularly with transactions issued by the users that paid the most, and not according to their timestamp. This is a fundamental flaw because querying data formatted in that way is far from optimal. This also means that while data is secure on the blockchain, it is not accessible in an efficient manner. As an example, if an enterprise wants to manipulate medical data on the blockchain, but cannot do it fast enough to efficiently attend to their patients, the enterprise would have to resort to a third party service that sorts the data in a time series database and then provides an application programming interface (API) to access it. While this would solve the speed conundrum, it destroys the entire concept of decentralization since there is a single point of failure: the company sorting the data.

Based on the foregoing, current graph database and distributed ledger technologies and processes may be modified and improved so as to provide enhanced functionality and features. Such enhancements and improvements may effectively decrease the cost and effort required to create and manage graph databases, while simultaneously improving the reliability, accuracy, security, and functionality of graph databases. Additionally, such enhancements and improvements may provide for optimized database request processing, improved graph creation capabilities, improved graph redundancy, increased autonomy, improved interactions with users and/or devices, improved user satisfaction, increased efficiencies, increased access to meaningful data, substantially-improved decision-making abilities, increased ease-of-use, and/or simplified or reduced maintenance. Furthermore, such enhancements and improvements may reduce processor usage, memory usage, network bandwidth usage, and/or other computing resources. Moreover, such enhancements and improvements may be improved and optimized over time through the use of artificial intelligence and/or machine learning.

SUMMARY

A system and accompanying methods for providing a graph protocol for forming a decentralized and distributed graph database are disclosed. In particular, the system and methods implement a distributed computing methodology that utilizes aspects of graph computing and decentralized ledger technologies to facilitate the creation of a graph database that is not only distributed, but also decentralized. Notably, the system and methods allow users and/or devices to outsource the storage and computation requirements of a graph database to a network of peers. These network of peers can, securely and verifiably, store, run computations on, and update the graph database in a distributed and efficient manner. Additionally, the functionality provided by the system and methods may prevent the corruption and hacking of data, while simultaneously offering options to maintain privacy and encrypt data so that even the peers storing and running the computations on the data in the graph database cannot read the data. Based on the foregoing, the system and methods provide a decentralized supercomputer specifically designed for graph databases and related technologies.

Notably, the graph protocol facilitated and generated by the system and methods provides functionality to solve a variety of shortcomings associated with current graph database enterprise solutions and existing distributed ledger technologies, such as blockchains and directed acyclic graphs. For example, existing graph database enterprise solutions often lack robust security, have concerns relating to data and knowledge sharing, and have high costs. The graph protocol provided according to the system and methods provides features and functionality that solves these issues. The system and methods combine the best of the distributed ledger technology and cloud database technologies. From a user experience perspective, the graph protocol has common functionality with existing current graph database solutions, with capabilities for queries, storage and complex data manipulation. Additionally, the system and methods enable users, devices, and/or programs to create their own graph databases and have them hosted on a network of masternodes. In certain embodiments, masternodes are users, devices, programs, and/or functions that rent out their storage and computational power in return for monetary rewards, much like Bitcoin miners. In certain embodiments, each graph database is not entirely replicated across each masternode, but rather is sharded into separate subgraphs so that each masternode is not overloaded with data. Queries to the graph may be broadcasted to the network of masternodes and executed for a fee. The queries may then be distributed across multiple masternodes storing the relevant data in order to maximize efficiency and throughput. In certain embodiments, the generated graphs can be either public or private. If a graph is created as private by its user, the data and queries sent to the masternodes hosting the graph may be encrypted so that perfect privacy can be maintained. A public graph may be made accessible to various devices and/or masternodes without encryption, for example. Furthermore, the result of queries and/or computations sent to masternodes may be guaranteed to be accurate via a verifiable computing algorithm and a reputation system. Users, devices, programs, and/or functions may also be free to choose which method of payment they would like to offer masternodes. This can range from digital assets such as Bitcoin, Ethereum, or stablecoins to other currencies, such as U.S. dollars. Depending on the desired security for a given graph, a user, device, program, and/or function can also decide how much a masternode should stake in order to participate in the graph protocol network. However, a higher stake may also correlate with higher storage and query fees.

Notably, in one embodiment according to the present disclosure, a system for providing a graph protocol for forming a decentralized and distributed graph database is disclosed. The system may include a memory that stores instructions and a processor that executes the instructions to perform operations conducted by the system. In certain embodiments, the system may perform an operation that includes receiving, such as from a user device, a bid request to generate a graph on a graph protocol network of the system. In certain embodiments, the bid request may contain first metadata that identifies a first set of requirements associated with the graph of the bid request. The system may proceed to perform an operation that includes receiving, from a first masternode of the graph protocol network, an ask request associated with providing storage and computational power for servicing the bid request. In certain embodiments, the ask request may contain second metadata that identifies a second set of requirements associated with the ask request. Additionally, the system may perform an operation that includes determining if the first set of requirements of the bid request from the user device match the second set of requirements of the ask request from the first masternode. Furthermore, the system may perform an operation that includes arranging the first masternode and a plurality of other masternodes capable of servicing the bid request into a router of the graph protocol network. Moreover, the system may perform an operation that includes generating, if the first set of requirements match the second set of requirements, the graph on the graph protocol network by utilizing at least the first masternode of the router of the graph protocol network.

In another embodiment, a method for providing a graph protocol for forming a decentralized and distributed graph database is disclosed. The method may include utilizing a memory that stores instructions, and a processor that executes the instructions to perform the various functions of the method. In particular, the method may include receiving, from a user device, a bid request to generate a graph on a graph protocol network of the system. In certain embodiments, the bid request may contain first metadata identifying a first set of requirements associated with the graph of the bid request. Additionally, the method may include receiving, from a first masternode of the graph protocol network, an ask request associated with providing storage and computational power for servicing the bid request. In certain embodiments, the ask request may contain second metadata identifying a second set of requirements associated with the ask request. The method may also include determining if the first set of requirements of the bid request from the user device match the second set of requirements of the ask request from the first masternode. Furthermore, the method may include arranging the first masternode and a plurality of other masternodes suitable for processing the bid request into a router of the graph protocol network. Moreover, the method may include generating, if the first set of requirements match the second set of requirements, the graph on the graph protocol network by utilizing at least the first masternode of the router of the graph protocol network.

According to yet another embodiment, a computer-readable device, such as a non-transitory computer-readable device, having and storing instructions for providing an artificially-intelligent graph database is provided. The computer instructions, which when loaded and executed by a processor, may cause the processor to perform operations including: receiving, from a user device, a bid request to generate a graph on a graph protocol network of the system, wherein the bid request contains first metadata identifying a first set of requirements associated with the graph of the bid request; receiving, from a first masternode of the graph protocol network, an ask request associated with providing storage and computational power for servicing the bid request, wherein the ask request contains second metadata identifying a second set of requirements associated with the ask request; determining if the first set of requirements of the bid request from the user device match the second set of requirements of the ask request from the first masternode; arranging the first masternode and a plurality of other masternodes into a router of the graph protocol network; and generating, if the first set of requirements match the second set of requirements, the graph on the graph protocol network by utilizing at least the first masternode of the router of the graph protocol network.

These and other features of the systems and methods for providing a graph protocol for forming a decentralized and distributed graph database according are described in the following detailed description, drawings, and appended claims.

DETAILED DESCRIPTION OF THE INVENTION

Figure 1:
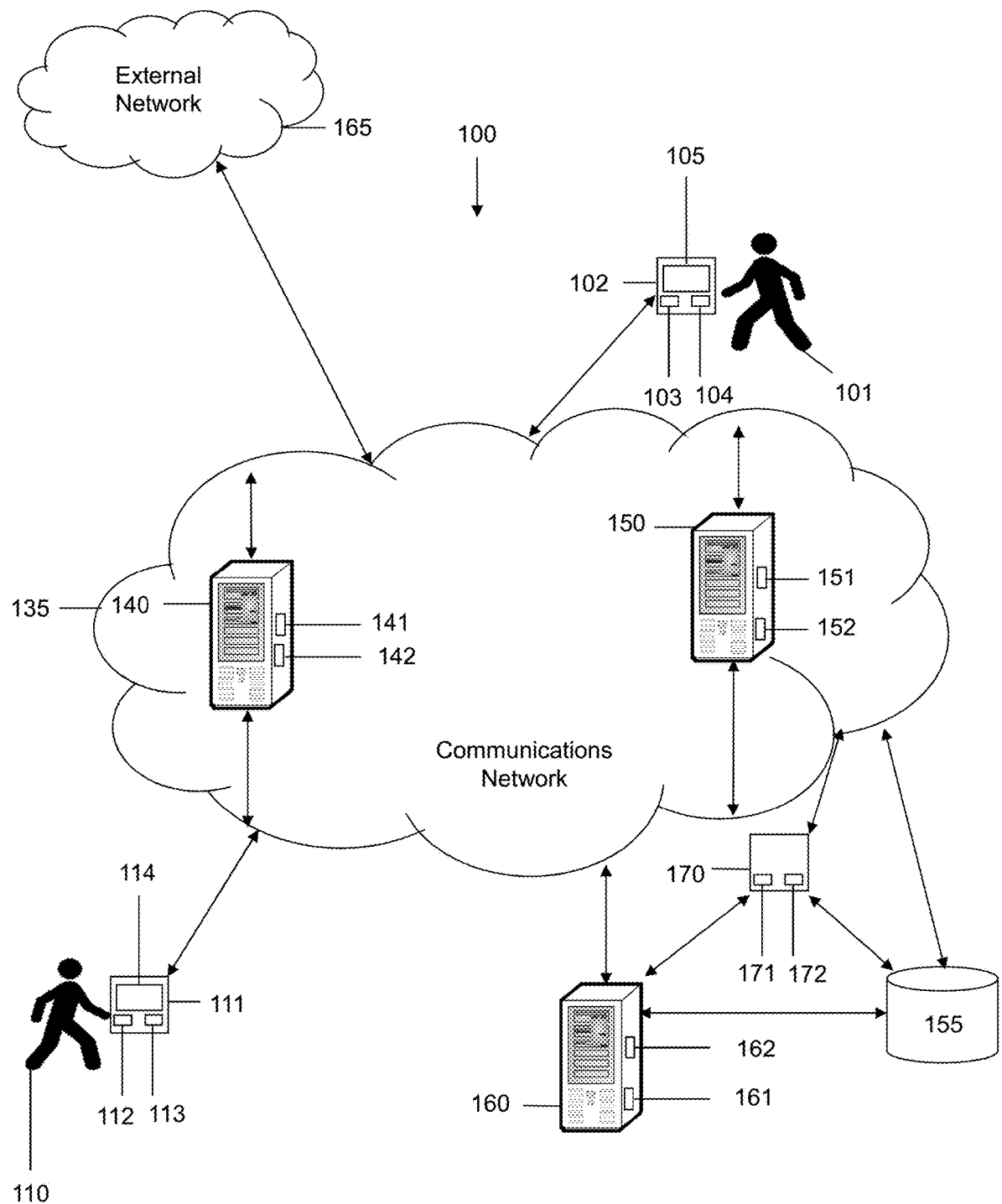
FIG. 1 is a schematic diagram of a system for providing a graph protocol for forming a decentralized and distributed graph database according to an embodiment of the present disclosure.

A system 100 and accompanying methods for providing a graph protocol for forming a decentralized and distributed graph database are disclosed. In particular, the system and methods implement a distributed computing methodology that utilizes aspects of graph computing and decentralized ledger technologies to facilitate the creation of a graph database that is not only distributed, but also decentralized. Notably, the functionality provided by the system 100 and accompanying methods may not only be utilized with graph databases, but may be extended to be utilized with any type of database. The system and methods enable users, devices, and/or programs to create their own graph databases and have them hosted on a network of masternodes. The masternodes may be users, devices, programs, and/or functions that rent out or otherwise provide their storage and computational power in return for monetary rewards, much like Bitcoin miners. In certain embodiments, each graph database is not entirely replicated across each masternode, but rather is sharded or broken up into separate subgraphs so that each masternode is not overloaded with data. Queries to the graph may be broadcasted to the network of masternodes and executed for a fee. The queries may then be distributed across multiple masternodes storing the relevant data in order to maximize efficiency and throughput. In certain embodiments, the generated graphs can be either public or private. If a graph is created as private by its user, the data and queries sent to the masternodes hosting the graph may be encrypted so that perfect privacy can be maintained. Furthermore, the result of queries and/or computations sent to masternodes may be guaranteed to be accurate via a verifiable computing algorithm and a reputation system. Users, devices, programs, and/or functions may also be free to choose which method of payment they would like to offer masternodes. Depending on the desired security for a given graph, a user, device, program, and/or function can also decide how much a masternode should stake in order to participate in the graph protocol network.

As shown in FIGS. 1-12, a system 100 and methods 1000, 1100 for providing a graph protocol for forming a decentralized and distributed graph database are disclosed. Notably, the system 100 may also be utilized to generate and adjust graphs through the use of a decentralized network of devices, programs, and/or systems. The system 100 may be configured to support, but is not limited to supporting, graph database services, other database services, distributed ledger technologies, natural language processing services, machine learning services, data and content services, artificial intelligence services, computing applications and services, cloud computing services, internet services, satellite services, telephone services, software as a service (SaaS) applications and services, mobile applications and services, platform as a service (PaaS) applications and services, web services, client servers, and any other computing applications and services. The system 100 may include a first user 101, who may utilize a first user device 102 to access data, content, and applications, or to perform a variety of other tasks and functions. As an example, the first user 101 may utilize first user device 102 to access an application (e.g. a browser, a database 155, or a mobile application) executing on the first user device 102 that may be utilized to access web pages, data, and content associated with the system 100. In certain embodiments, the first user 101 may be any type of user that may desire to generate graphs in the system 100 for storage in the database 155, update graphs of the database 155, add data to a database 155, manipulate the database 155, access the database 155, access graphs of the database 155, access subgraphs of the database 155, remove data from the database 155, perform any action with respect to the database 155, perform any action with respect to the system 100, or any combination thereof.

The first user device 102 utilized by the first user 101 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102, to interact with the database 155, to interact with various applications executing within the system 100, and to interact with the system 100 itself. In certain embodiments, the first user device 102 may include components that provide non-visual outputs. For example, the first user device 102 may include speakers, haptic components, tactile components, or other components, which may be utilized to generate non-visual outputs that may be perceived and/or experienced by the first user 101. In certain embodiments, the first user device 102 may be configured to not include interface 105. In certain embodiments, the first user device 102 may be a computer, a laptop, a tablet device, a phablet, a server, a mobile device, a smartphone, a smart watch, and/or any other type of computing device. Illustratively, the first user device 102 is shown as a mobile device in FIG. 1. In certain embodiments, the first user device 102 may also include a global positioning system (GPS), which may include a GPS receiver and any other necessary components for enabling GPS functionality, accelerometers, gyroscopes, sensors, and any other componentry suitable for a mobile device.

In addition to the first user 101, the system 100 may include a second user 110, who may utilize a second user device 111 to access data, content, and applications, or to perform a variety of other tasks and functions. As with the first user 101, in certain embodiments, the second user 110 may be any type of user that may desire to generate graphs in the system 100 for storage in the database 155, update graphs of the database 155, add data to a database 155, manipulate the database 155, access the database 155, access graphs of the database 155, access subgraphs of the database 155, remove data from the database 155, perform any action with respect to the database 155, perform any action with respect to the system 100, or any combination thereof. Much like the first user 101, the second user 110 may utilize second user device 111 to access an application (e.g. a browser or a mobile application) executing on the second user device 111 that may be utilized to access web pages, data, and content associated with the system 100. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. a screen, a monitor, a graphical user interface, etc.) that may enable the second user 110 to interact with various applications executing on the second user device 111, to interact with various applications executing in the system 100, to interact with the database 155, and to interact with the system 100. In certain embodiments, the second user device 111 may be a computer, a laptop, a tablet device, a phablet, a server, a mobile device, a smartphone, a smart watch, and/or any other type of computing device. Illustratively, the second user device 111 may be a computing device in FIG. 1. The second user device 111 may also include any of the componentry described for first user device 102.

In certain embodiments, the first user device 102 and the second user device 111 may have any number of software applications and/or application services stored and/or accessible thereon. For example, the first and second user devices 102, 111 may include database applications, graph database applications, distributed ledger-based applications, artificial intelligence-based applications, machine learning-based applications, applications for facilitating the completion of tasks, cloud-based applications, search engine applications, natural language processing applications, database applications, algorithmic applications, phone-based applications, product-ordering applications, business applications, e-commerce applications, media streaming applications, content-based applications, gaming applications, internet-based applications, browser applications, mobile applications, service-based applications, productivity applications, video applications, music applications, social media applications, presentation applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 110 to interact with any device in the system 100, any network in the system 100, or any combination thereof. For example, the software applications executing on the first and second user devices 102, 111 may be applications for receiving data, applications for storing data, applications for transforming data, applications for executing mathematical algorithms, applications for generating and transmitting electronic messages, applications for generating and transmitting various types of content, any other type of applications, or a combination thereof. In certain embodiments, the first and second user devices 102, 111 may include associated telephone numbers, internet protocol addresses, device identities, or any other identifiers to uniquely identify the first and second user devices 102, 111 and/or the first and second users 101, 110. In certain embodiments, location information corresponding to the first and second user devices 102, 111 may be obtained based on the internet protocol addresses, by receiving a signal from the first and second user devices 102, 111, or based on profile information corresponding to the first and second user devices 102, 111. In certain embodiments, the location information may be obtained by utilizing global positioning systems of the first and/or second user devices 102, 111.

The system 100 may also include a communications network 135. The communications network 135 of the system 100 may be configured to link each of the users, devices, programs, and/or functions in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. The communications network 135 may also include and be connected to a cloud-computing network, a phone network, a wireless network, an Ethernet network, a satellite network, a broadband network, a cellular network, a private network, a cable network, the Internet, an internet protocol network, a content distribution network, a virtual private network, any network, or any combination thereof. Illustratively, server 140 and server 150 are shown as being included within communications network 135.

Notably, the functionality of the system 100 may be supported and executed by using any combination of the servers 140, 150, and 160. The servers 140, and 150 may reside in communications network 135, however, in certain embodiments, the servers 140, 150 may reside outside communications network 135. The servers 140 and 150 may be utilized to perform the various operations and functions provided by the system 100, such as those requested by applications executing on the first and second user devices 102, 111. Additionally, the servers 140, 150 may be configured to perform any of the various operations described in the present disclosure, which may be utilized to facilitate the operation of the artificially-intelligent routers (i.e. agents), any device of the system 100, any functionality provided by the system 100, or a combination thereof. In certain embodiments, the server 140 may include a memory 141 that includes instructions, and a processor 142 that executes the instructions from the memory 141 to perform various operations that are performed by the server 140. The processor 142 may be hardware, software, or a combination thereof. In certain embodiments, in addition to the storage capabilities of the database 155 discussed in further detail in this disclosure, the servers 140, 150 may include storage components that may be configured to store and maintain any information generated by the system 100 and/or methods described herein, or a combination thereof. Much like server 140, the server 150 may include a memory 151 that includes instructions, and a processor 152 that executes the instructions from the memory 151 to perform the various operations that are performed by the server 150. In certain embodiments, the servers 140, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 150 may be communicatively linked to the communications network 135, any network, any device in the system 100, or any combination thereof.

The database 155 of the system 100 may be utilized to store and relay information that traverses the system 100, cache information and/or content that traverses the system 100, store data about each of the devices in the system 100, and perform any other typical functions of a database. In certain embodiments, the database 155 may store the output from any operation performed by the system 100, operations performed and output generated by the first and second user devices 102, 111, the servers 140, 150, 160, or any combination thereof. In certain embodiments, the database 155 may be a graph database, any type of database, or any combination thereof. The database 155 may also incorporate any functionality of any existing graph database. In certain embodiments, the database 155 may store a record of any and all information generated by the system 100, store any information associated with the artificially-intelligent routers/agents, store any information associated with graph representations utilized in the system 100, store graph-structured data, store graphs, store subgraphs of the graphs, store updates and modifications performed to graphs, store information relating to the computational capabilities and storing capabilities of routers and/or masternodes, store information associated with assignments of artificially-intelligent routers/agents with subgraphs (or other portions of graphs), store bid requests, store queries, store ask requests, store algorithm requirements utilized by the system 100, store information learned by the artificially-intelligent routers/agents, store media content, store any information associated with masternodes, store any information generated and/or received by the system 100, any other data traversing the system 100, or any combination thereof. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operations associated with the database 155. In certain embodiments, the database 155 may be connected to the servers 140, 150, 160, the first user device 102, the second user device 111, any devices in the system 100, any other device, any network, or any combination thereof.

The database 155 may also store information obtained from the system 100, store information associated with the first and second users 101, 110, store location information for the first and second user devices 102, 111 and/or first and second users 101, 110, store user profiles associated with the first and second users 101, 110, store device profiles associated with any device in the system 100, store communications traversing the system 100, store user preferences, store demographic information for the first and second users 101, 110, store information associated with any device or signal in the system 100, store information relating to usage of applications accessed by the first and second user devices 102, 111, store any information obtained from any of the networks in the system 100, store historical data associated with the first and second users 101, 110, store device characteristics, store information relating to any devices associated with the first and second users 101, 110, or any combination thereof. The user profiles may include any type of information associated with an individual (e.g. first user 101 and/or second user 110), such as, but not limited to, a username, a password, contact information, demographic information, psychographic information, an identification of applications used or associated with the individual, any attributes of the individual, any other information, or a combination thereof. Device profiles may include any type of information associated with a device, such as, but not limited to, operating system information, hardware specifications, information about each component of the device (e.g. sensors, processors, memories, batteries, versions, etc.), attributes of the device, any other information, or a combination thereof. In certain embodiments, the database 155 may store algorithms facilitating the operation of the system 100. In certain embodiments, the database 155 may be configured to store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

In certain embodiments, the system 100 may communicate and/or interact with an external network 165. In certain embodiments, the external network 165 may include any number of servers, databases, or other componentry, and, in certain embodiments, may be controlled by a service provider. The external network 165 may also include and be connected to a cloud-computing network, a phone network, a wireless network, an Ethernet network, a satellite network, a broadband network, a cellular network, a private network, a cable network, the Internet, an internet protocol network, a content distribution network, a virtual private network, any network, or any combination thereof. In certain embodiments, the external network 165 may be accessed by the components of the system 100, such as the database 155, the server 140, 150, and the server 150. For example, the database 155 may access resources of the external network 165 to supplement the data stored in the database 155, to confirm data in the database 155, and/or to perform any other operations. In certain embodiments, the external network 165 may be accessed by the components of the system 100 to obtain data and information that may potentially be utilized to obtain graph-structured data for use with the graphs and/or subgraphs of the database 155, obtain data to be utilized by the artificially-intelligent routers (i.e. agents), obtain data that may be utilized for any artificial-intelligence-related and/or other operation conducted by the system 100, or any combination thereof.

The system 100 may also include a software application or program, which may be configured to perform and support the operative functions of the system 100. In certain embodiments, the application may be a software program, a website, a mobile application, a software application, a software process, or a combination thereof, which may be made accessible to users utilizing one or more computing devices, such as first user device 102 and second user device 111. In certain embodiments, the software application or program may include one or more applications that may be configured to interact with the database 155 and/or a virtual database, and may include any functionality that may be utilized to support the functionality of the system 100 and/or the methods disclosed herein. The application of the system 100 may be accessible via an internet connection established with a browser program executing on the first or second user devices 102, 111, a mobile application executing on the first or second user devices 102, 111, or through other suitable means. Additionally, the application may allow users and computing devices to create accounts with the application and sign-in to the created accounts with authenticating username and password log-in combinations. The application may include a custom user interface that the first user 101 or second user 110 may interact with, such as by utilizing a web browser or other program executing on the first user device 102 or second user device 111. In certain embodiments, the software application may execute directly as an installed program on the first and/or second user devices 102, 111, such as a mobile application or a desktop application. In certain embodiments, the software application may execute directly on any combination of the servers 140, 150, 160.

The software application may include multiple programs and/or functions that execute within the software application and/or are accessible by the software application. For example, the software application may include an application that generates web content and pages that may be accessible to the first and/or second user devices 102, 111, any type of program, or any combination thereof. The application that generates web content and pages may be configured to generate a user interface 228 for the software application that is accessible and viewable by the first and second users 101, 110 when the software application is loaded and executed on the first and/or second computing devices 102, 111. The user interface for the software application may display content for viewing by the first and/or second users 101, 110 via the first and/or second user devices 102, 111. Additionally, the user interface may display functionality provided by the software application that enables the first and second users 101,110 and/or the first and second computing devices 102, 111 to interact with the software application and any modules supporting the software application's functionality. In certain embodiments, the software application may be configured to facilitate any operation conducted by the system 100, any program or process in the system 100, or any combination thereof.

The system 100 may also include any number of artificially-intelligent agents/routers, which may be configured to facilitate the operative functionality of the system 100 and methods described herein. For the purposes of the present disclosure, the term "artificially-intelligent agents" may be used interchangeably with the term "routers" when the term "routers" is referring to and/or related to the router abstraction concepts provided in the present disclosure. In certain embodiments, the routers/artificially-intelligent agents may comprise software, hardware, or a combination thereof, and may be configure to execute within any device of the system 100 (e.g. database 155, first and/or second user devices 102, 111, servers 140, 150, 160, etc.). The routers/artificially-intelligent agents may be configured to create graphs, create subgraphs, process queries intended for a graph/subgraph, update graphs/subgraphs, edit graphs/subgraphs, delete graphs/subgraphs, analyze graphs/subgraphs, analyze graph data within the graphs/subgraphs, perform any operation with respect to the graphs/subgraphs, or a combination thereof. In certain embodiments, the artificially-intelligent agents may be implemented using goroutines (or by using any other suitable methodology and/or technology), and the highly concurrent functionality of the goroutines may be a mechanism through which the artificial intelligence of each artificially-intelligent agent is implemented. The functionality provided by the system 100 and methods may be implemented using Golang (and/or by using any other suitable language) by tying goroutines to graph-structured data of a graph of a graph database that is to be explored or used in algorithms to be executed by the system 100. In certain embodiments, the individual goroutines that are used to implement the artificially-intelligent agents may define (not merely control) and/or encapsulate the subgraphs (of a graph of a graph database) of interest, with the relevant graph structure, vertex and edge properties defined in the variable size stack corresponding to the particular goroutine.

Figure 2:
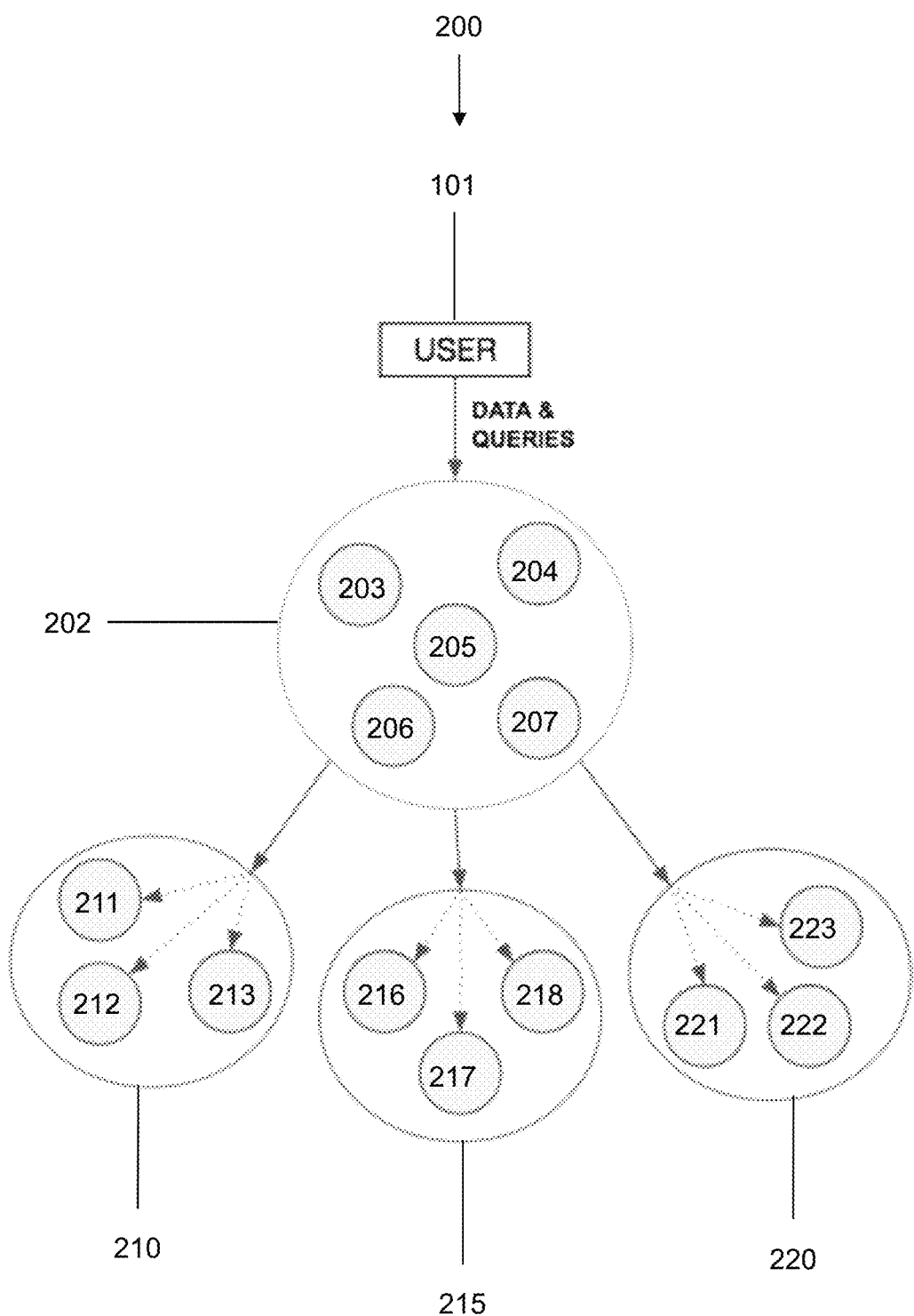
FIG. 2 is a schematic diagram illustrating a main router including masternodes and a plurality of regular routers also including a plurality of masternodes for use with the system of FIG. 1.
Figure 3:
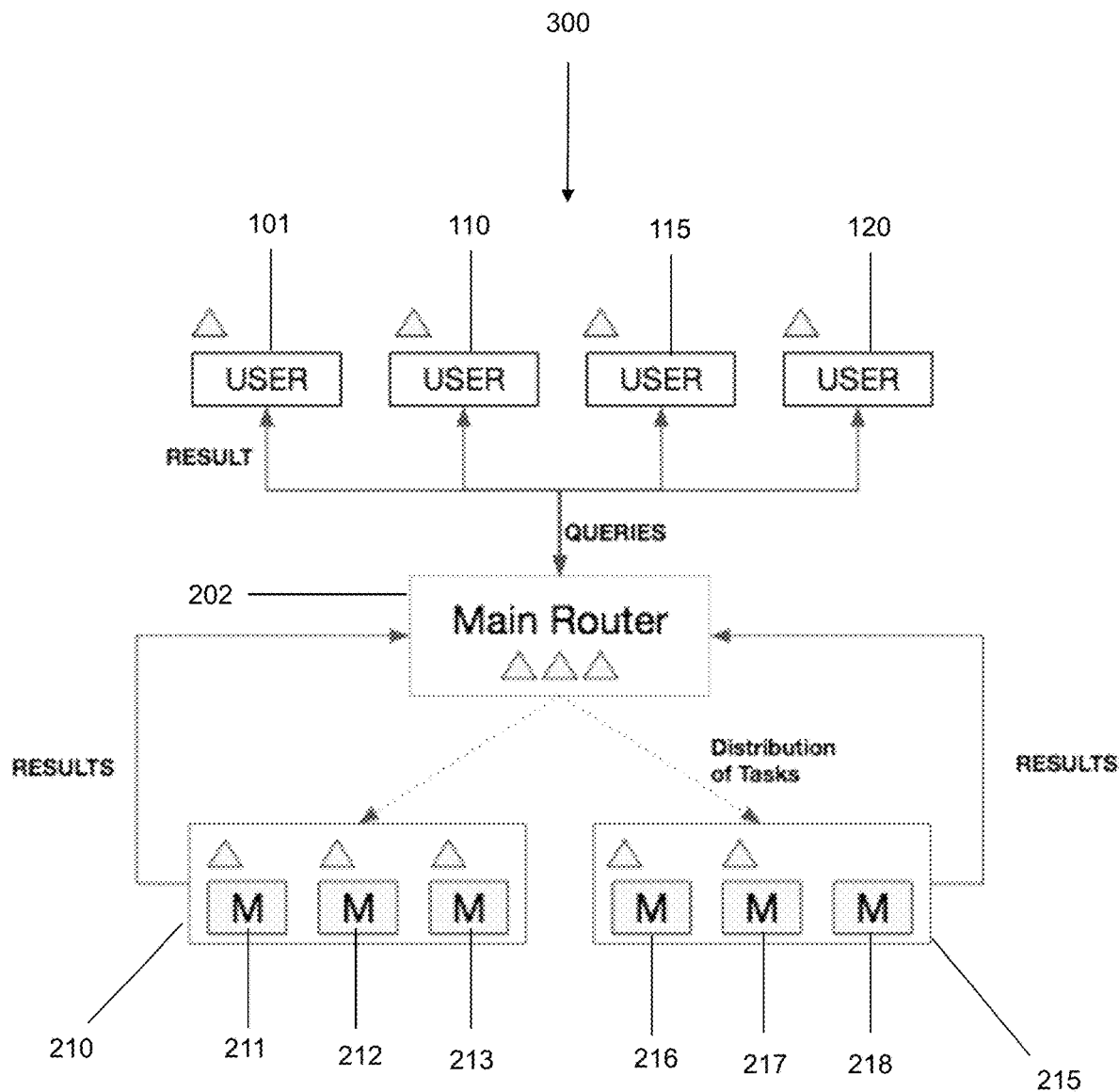
FIG. 3 illustrates a schematic diagram illustrating a plurality of tasks that are handed down from users to a main router, which are then forwarded for processing to a plurality of regular routers including a plurality of masternodes.

The technology provided in U.S. Provisional Patent Application No. 62/741,399, entitled "System and Methods for Providing an Artificially-Intelligent Graph Database, which is incorporated by reference herein, served as an inspiration for the architecture of the graph protocol facilitated by the system 100. To that end and referring now also to FIGS. 2-3, routers/artificially-intelligent agents may comprise a collection of any number of masternodes (e.g. masternodes 203-207, 211-213, 216-218, 221-223) that work and communicate together to maximize security, throughput, and fault tolerance in the system 100. For example, in FIG. 2, the diagram 200 provides a physical architectural representation of the machines in the system 100 that may be configured to store a graph. The masternodes may comprise hardware, software, a combination of hardware and software, robots, processes, functions, servers, computers, smart devices, wearable devices, any type of device, or a combination thereof. As shown in FIGS. 2-3, there may be several types of routers, such as but not limited to, main routers (e.g. main router 202) and regular routers (e.g. regular routers 210, 215, 220, 402, 404, 406). The first large circle in FIG. 2 is a main router 202, which includes a plurality of smaller circles, which correspond to masternodes 203-207 of the main router 202. The next three large circles in FIG. 2 are regular agents/routers 210, 215, 220, which also contain small circles, which correspond to masternodes 211-213, 216-218, and 221-223. Each of the masternodes of a particular regular router may be configured to store the same subgraph (i.e. of a graph) associated with that particular regular router, process queries, generate graphs and/or subgraphs, and perform a variety of other functions. The main router 202, on the other hand, has the responsibility of redirecting data flow, tasks, requests, and/or queries to the appropriate regular routers 210, 215, 220 (i.e. routers that store subgraphs of an entire graph). Additionally, the main router 202 may be configured to receive results associated with the tasks, requests, and/or queries from the regular routers, and may then forward such results to the devices associated with users associated with the tasks, requests, and/or queries. Each of the regular routers 210, 215, 220 may create and/or store a separate subgraph of a graph. Notably, each graph stored using the graph protocol may be shared into the subgraphs, which may be stored on the regular routers 210, 215, 220. Each subgraph may contain a set of vertices with their corresponding edges. Each regular router 210, 215, 220 may store a single subgraph (or more depending on the embodiment) and may be connected to the other regular routers 210, 215, 220 via the edges that originate in one subgraph and end in another. (See FIG. 4 as an example). The subgraphs may be stored under the RDF convention and/or using any other convention.

The architectures provided in FIGS. 2-3 are provided for several reasons. One reason is for the random replication of data across machines around the world. Another reason is for the distribution of tasks. The system 100 utilizes artificial intelligence to manage what parts of a graph that routers should store in order to maximize efficiency. The system 100 may do so by determining what queries are often being run and on what parts of a particular graph. The system 100 may utilize a distributed task queue system within its own routers and masternodes. For example, FIG. 3 illustrates how tasks, such as those requested by users 101, 110, 115, and 120, may be distributed and processed in the system 100. In FIG. 3, the tasks are represented by triangles. In certain embodiments, the tasks may include, but are not limited to, queries for anything associated with a graph or any type of query, requests to generate graphs, updating data of a graph, updating a subgraph, updating a graph, updating data of a subgraph, removing data of a graph, removing a subgraph, removing a graph, removing data of a subgraph, any type of task, or a combination thereof. The tasks, for example, may be transmitted from the users 101, 110, 115, 120 such as via the first and/or second user devices 102, 111 (or other device). The tasks may be received by the main router 202, which can determine which regular routers 210, 215, 220 and which corresponding masternodes 211-213, 216-218, 221-223 should process and/or handle the tasks. The determined masternodes may process and complete the tasks and return the outputs of the completed tasks to the main router 202, which, in turn, can transmit the outputted results to the users 101, 110, 115, 120 if needed. In certain embodiments, the results of the tasks may be stored in the database 155 for future use as well.

Notably, each graph generated and/or stored in the system 100 may have its own dedicated main router 202. The main router 202 may keep track of the subgraphs stored in each of the masternodes and/or regular routers 210, 215, 220 associated with the subgraphs. In certain embodiments, the main router 202 may serve as the primary point of contact for users and masternodes in a graph. The main router 202 may be selected via a voting process, such as once a graph is created and the routers are chosen. Masternodes may participate in the voting process and may select the main router 202. In certain embodiments, other devices and/or systems and/or components of the system 100 may participate in the voting process as well. In certain embodiments, the system 100 may incorporate the use of verifiable delay functions in order to create a fair and secure process to select the main router 202. In certain embodiments, other techniques may be utilized to select the main router 202 including ethereum (or other) commit and reveal schemes, any other technique for selecting a main router 202, or a combination thereof. In the context of verifiable delay functions, a scenario associated with selecting a main router 202 may occur as follows. For example, a malicious adversary of the system 100 may attempt to manipulate the outcome of the voting process for selecting the main router 202 by refusing to participate in the vote after determining the other masternodes' voting selections or by trying to sell their swing vote, thereby corrupting the voting process for selecting the main router 202. In certain embodiments, the verifiable delay functions may be separated into three steps. In a first step, a setup function may be utilized to create a puzzle with a given difficulty and output a verification and an evaluation key. In certain embodiments, each masternode that participates in the vote may start by running the setup with a given minimum difficulty. In a second step, an eval function may be utilized, which takes the evaluation key and an input, and outputs a number and a proof. The input, for example, may be the masternode's vote for the main router 202. In a third step, a verify function may take an input, an output (the number from the eval function) and proof and outputs a Boolean value. Once all the masternodes have voted, the masternodes can execute the verify function on the other masternodes' eval output number and proofs to verify their vote.

Figure 4:
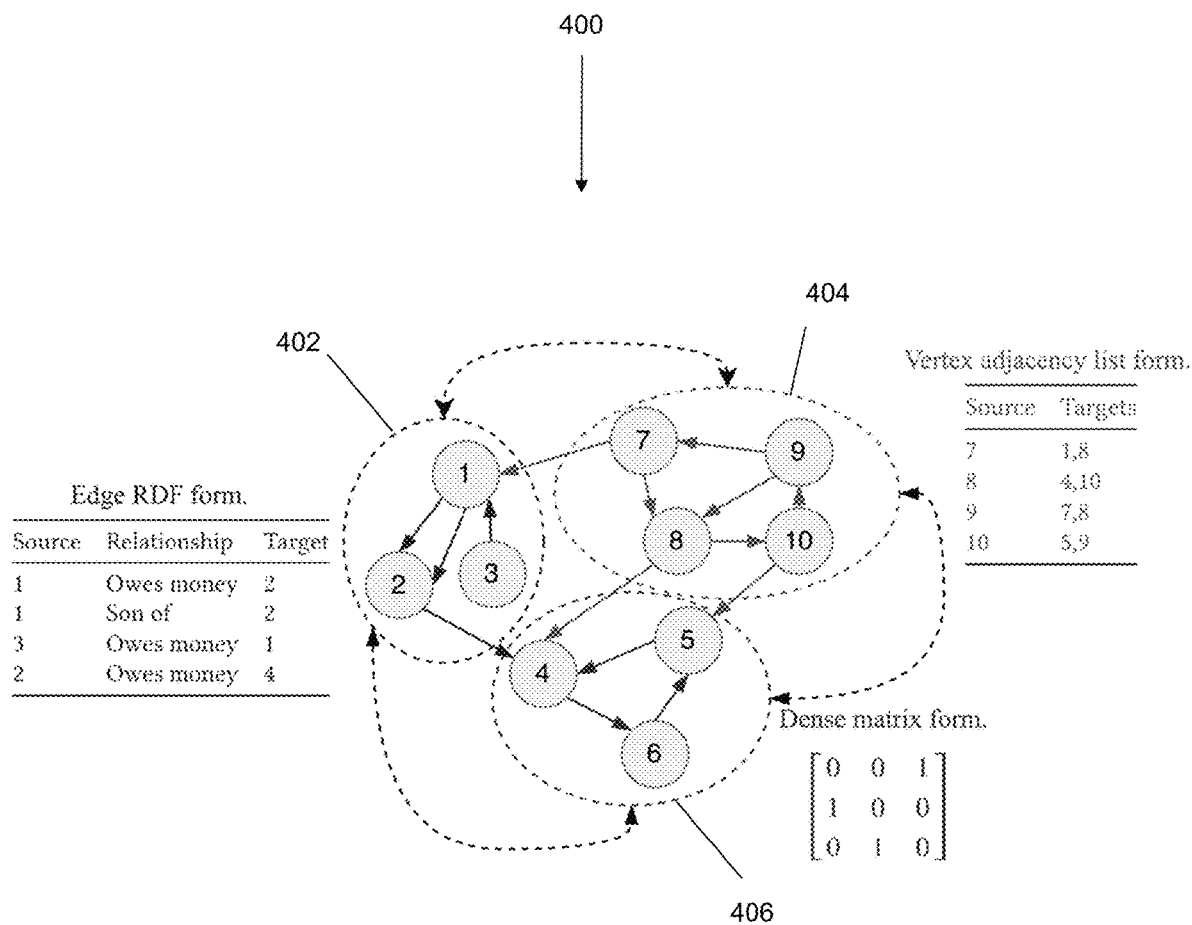
FIG. 4 illustrates a series of routers indicated by dotted circles and a plurality of vertices within each of the routers, each of which may be utilized to facilitate the functionality of the system of FIG. 1.

As shown in FIG. 4, the artificial intelligence of one router 404 (i.e. agent) (controlling nodes 7-10 and interconnected edges) may organize the subgraph it encapsulates using vertex adjacency lists, with another router's 402 (controlling nodes 1-3 and interconnected edges) artificial intelligence learning to use an RDF framework, and yet another router 406 (controlling nodes 4-6 and interconnected edges) using dense matrix form. An example of this sort of agent-dependent representation 400 is provide in FIG. 4. This approach has both computational benefits (since some operations have faster implementations in certain graph representations) and storage benefits (e.g. when using a sparse representation like CSR, or when compressing a subgraph consisting of nodes with high similarity). In FIG. 4, the dotted circles may represented information contained in a single router (e.g. a regular router or other router) and the circles within the dotted circles may be graph vertices of a graph. In the toy example of FIG. 4, it might be useful to be able to run SQL like queries on the blue router 402 (where joins on the edge-like RDF format are efficient), and matrix multiplications on the red router 406. Based on the functionality provided by the system 100 and methods, the system 100 and methods provide a graph database to natively store the graph structured data in a variety of forms with automatic mechanisms to allow these different representations to interact (without the need for manual conversions or boilerplate code), and do so through artificial-intelligence mechanisms considering past database requests, and its expectation of future database requests that are yet to come.

Notably, the system 100 may include various functionality and features that provide security and privacy for the system 100 itself, the data traversing the system 100, or a combination thereof. In particular, in certain embodiments, each masternode 203-207, 211-223 in the system 100 may be configured to store a plurality of Merkle-Patricia trees. For example, in certain embodiments, each masternode 203-207, 211-223 may be configured to store three Merkle-Patricia trees. The first Merkle-Patricia tree stored may be a router Merkle-Patricia tree. For the router Merkle-Patricia tree, each masternode 203-207, 211-223 in a particular router (e.g. routers 210, 215, 220 and/or even main router 202 in certain embodiments) may store the same subgraph of a graph. The leaf nodes of the router Merkle-Patricia tree may contain the vertices of the stored subgraph and an adjacency list of the edges extending from or towards the vertices. The second Merkle-Patricia tree stored may be a graph Merkle-Patricia tree. For the graph Merkle-Patricia tree, each masternode 203-207, 211-223 in a given graph (i.e. being used for generating and/or storing the graph) may store a Merkle-Patricia tree for the entire graph (including all subgraphs). In certain embodiments, the leaf nodes of the graph Merkle-Patricia tree may be the hash roots of the router Merkle-Patricia trees. The third Merkle-Patricia tree stored may be a graph protocol Merkle-Patricia tree. For the graph protocol Merkle-Patricia tree, each masternode in the graph protocol of the system 100 may store the entire protocol's Merkle-Patricia Tree. In certain embodiments, the leaf nodes of the graph protocol Merkle-Patricia Tree may be the hash roots of the graph Merkle-Patricia trees.

In certain embodiments, the three types of Merkle-Patricia trees described above may be configured to be small enough from a storage standpoint that they may be insignificant, such as when compared to the total storage capacity provided by the system 100. While the Merkle-Patricia trees may be small enough in size (e.g. smaller than a threshold amount of the total storage capacity), the Merkle-Patricia trees allow for masternodes 203-207, 211-223 to considerably improve the security of the graph protocol utilized in the system 100. This may be seen in the following exemplary scenario: A user, such as first user 101, may issue a transaction on a GRP graph (e.g. GRP graph 1040 discussed in further elsewhere in the present disclosure) of the system 100. The main router 202 may receive the transaction and pass the transaction to the appropriate router (e.g. one or more of routers 210, 215, 220) for processing. In certain embodiments, the masternodes (e.g. masternodes 211-223) of the router(s) that have received the transaction may analyze the transaction to determine if the router Merkle-Patricia tree (or possibly other types of Merkle-Patricia trees) associated with the transaction is valid. If all masternodes within a particular router agree that the transaction is a valid transaction, the masternodes may update their corresponding subgraphs and their corresponding router Merkle-Patricia trees (and possibly other types of Merkle-Patricia trees) to reflect the change brought about by the transaction. The masternodes may then broadcast the new updated Merkle-Patricia trees to the other masternodes in the system 100, such as, but not limited to, other masternodes that assisted in the creation of the graph associated with the transaction. In certain embodiments, even if a single masternode claims that the transaction is invalid, a conflict resolution vote may be initiated and each masternode associated with and/or in the graph can vote on whether the transaction is valid or invalid. The masternodes may accomplish this by querying their corresponding graph Merkle-Patricia trees, which contain the hash root of all router subgraphs in the system 100. Based on the querying, the masternodes may verify what the current amount of GRP (see discussion on GRP below) is in a digital wallet of the system 100.

In another example use-case scenario relating to security and privacy, a group of masternodes may attempt to delete or corrupt data on a particular graph stored and/or generated in the system 100. In attempting to do so, the masternodes may alter the subgraph data for the graph that the masternodes store. If even a single masternode in the same router detects the error associated with altering the subgraph data, a conflict resolution vote may be initiated in the system 100. Each masternode in the graph (and even possibly any masternode in the entire system 100 itself), can vote on which subgraph of the graph the masternodes believe is correct. The masternodes can do so by checking their Merkle-Patricia tree of the graph (which contains the hash root of all router subgraphs in the system 100) and verify what the current state of the subgraph should be.

Figure 5:
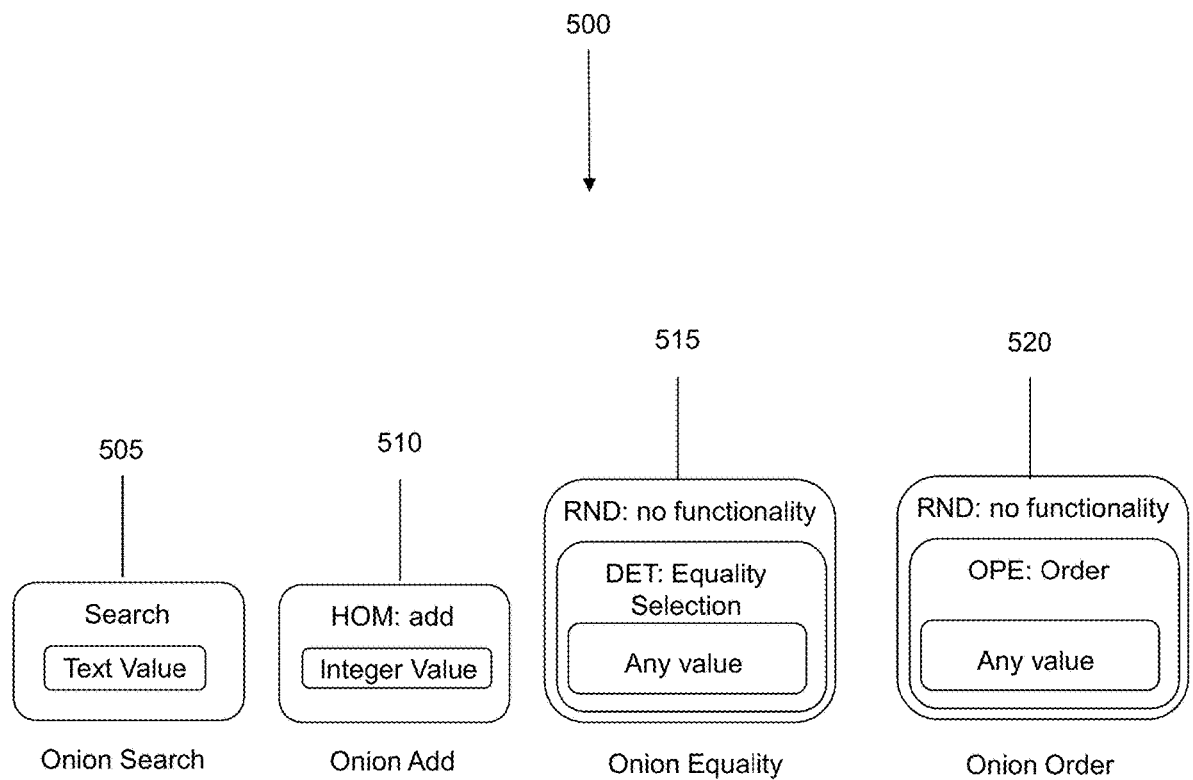
FIG. 5 is a schematic diagram illustrating various layers of encryption that may be utilized with the system of FIG. 1.

Notably, as part of the security and privacy of the system 100, the system 100 may also support queries on encrypted data. Referring now also to FIG. 5, a diagram 500 illustrating various layers of encryption, such as, but not limited to, onion encryption, is shown. In certain embodiments, users, such as first user 101, may want to be able to retain their data privacy. In order to facilitate this, the system 100 may incorporate one or more encryption features so that even the masternodes hosting user data may not be able to read the actual data being hosted. In particular, in certain embodiments, the system 100 enables the masternodes to compute queries on data that the masternodes cannot decrypt. In order to do so, the system 100 may incorporate adjustable query-based encryption. There may exist multiple levels of encryption suited to different sorts of queries. In certain embodiments, this type of encryption may correspond to onion encryption, which may facilitate adjustable query-based encryption, and/or any other suitable encryption methodology and/or scheme. With regard to onion encryption, onion encryption can adjust data's encryption levels to suit a given query type. For example, if a user, such as first user 101, just wants to store information on a graph without being able to perform data manipulation, the data may have RND (i.e. random) level encryption.

As indicated above, the system 100 may be configured to support multiple layers of encryption. Additionally, in certain embodiments, a user can request different levels of encryption for their data. For example, users may utilize the following layers of encryption, but may also utilize other layers of encryption as well: A first layer of encryption may be RND, which may provide the highest level of security. In this layer of encryption, even two values that are equal may be mapped to different ciphertexts. Ciphertexts may be the result of applying an encryption algorithm to plaintext. Notably, however, computations cannot often be performed efficiently on the ciphertext using RND. A second layer of encryption may be DET 515. DET 515 may generate the same ciphertext for the same plaintext, and the DET 515 layer may allow masternodes to compare two vertices for equality. A third layer of encryption may be order-preserving encryption 520 (OPE), which may establish order relations between data based on the encrypted values without leaking the data itself. For example, if $x_i y$, then $OPEK(x)_i OPEK(y)$. A fourth layer of encryption may be homomorphic encryption (HOM) 510, which may allow for masternodes to perform computations on encrypted data and for users to decrypt the final result. Notably, HOM 510 encryption is efficient. A fifth layer of encryption is SEARCH 505 encryption (e.g. Word Search), which allows for keyword search on encrypted text. Moreover, SEARCH 505 allows masternode to detect repeating plaintext in their stored data.

With regard to the above-identified querying process itself, the querying process may include a series of steps. First, the user (e.g. first user 101) may issue a query, such as by utilizing first user device 102. Then, the user may check if the masternode should be given keys to adjust the encryption layers before executing the query. If so, the user, by using the user's device, may strip off the layers of encryption (e.g. onion layers) by sending the corresponding keys to the masternodes. Once the keys are sent to the masternodes, the user may rewrite his or her query to an encrypted format and adjust the encryption layer, anonymizing vertices, edges, properties, and any constants. The user may then transmit the encrypted query to the masternode, which executes the query and returns an encrypted result. The user may then decrypt the received result using the first user device 102 (or other suitable device or program) and obtain the plaintext result (or other formal result).

Notably, the system 100 may include additional functionality and features that provide defense against various types of digital attacks as well. In certain embodiments, a primary attack scenario may comprise a combination of a Sibyl attack and a 50% attack. For example, a hacker may create a large amount of digital wallets within a GRP graph of the system 100, and may get enough masternodes by staking GRP tokens (or other types of assets and/or currencies), which may be a native currency of the graph protocol network. The GRP graph may be a graph that regulates and manages GRP tokens utilized in the system 100, which may be based on the graph protocol. The hacker may take control of enough masternodes to have control over any router (i.e. artificially-intelligent agent) in a particular graph. Controlling all of the masternodes in a router and having his or her wallet in the given router's subgraph may mean that the hacker could then initiate successful double spend attacks in the system 100. That being said, this type of attack often turns out to be economically unviable. For example, in order to gain control over any router in the GRP graph, the hacker would have to stake enough money (via GRP tokens, other digital assets, and/or other digital currencies) to have a significant probability of gainer control over a router. If the attack fails, the hacker would then have to be a very active participant in the network in order to not lose the GRP tokens staked (or other types of assets and/or currencies staked) to spin up his or her own masternodes in the system 100 and in associated routers.

Figure 6:
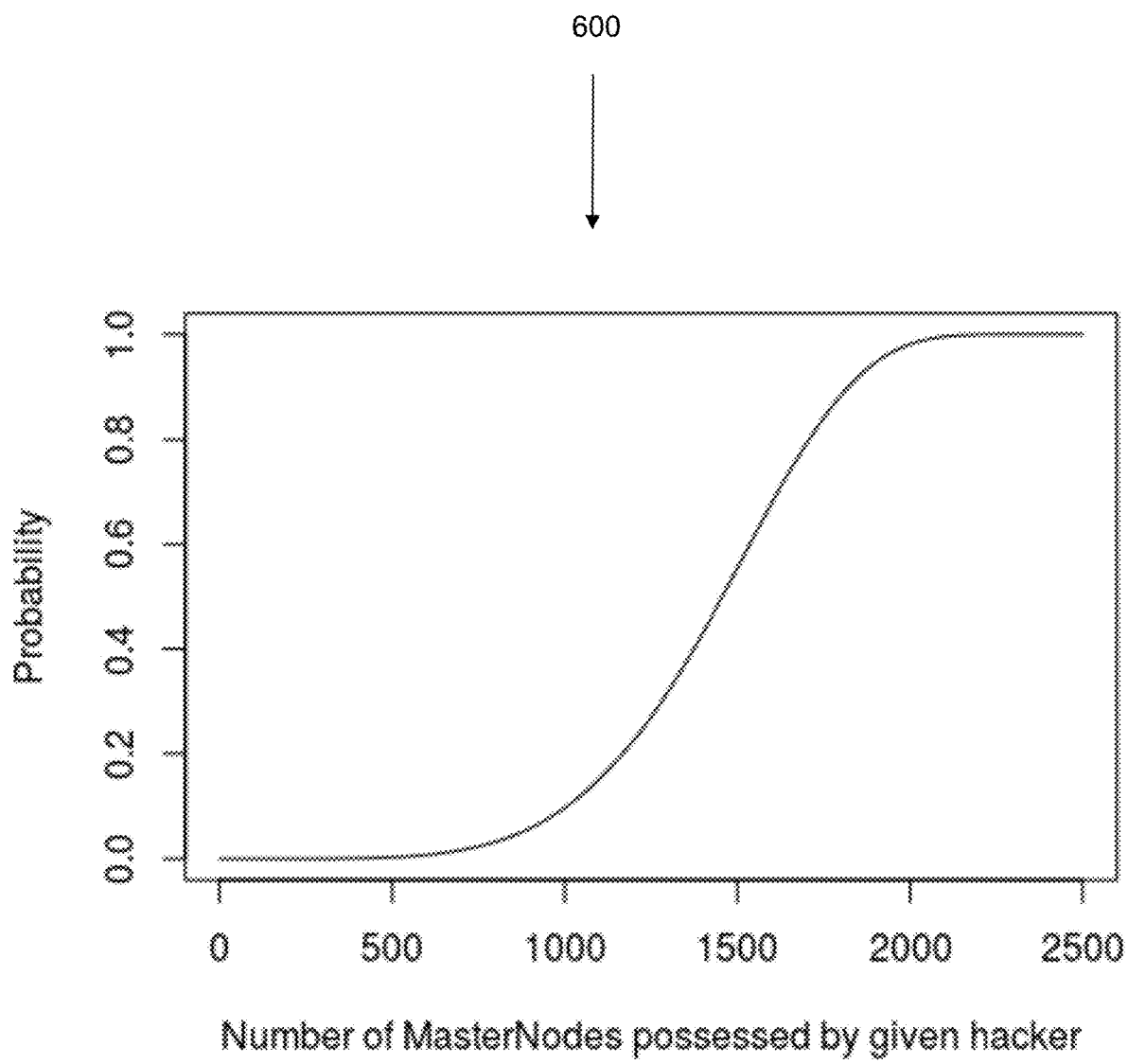
FIG. 6 illustrates a schematic graph plot illustrating the probability of a hacker gaining control over any router of the system of FIG. 1 versus the number of masternodes controlled by a hacker assuming there are 2500 total masternodes.
Figure 7:
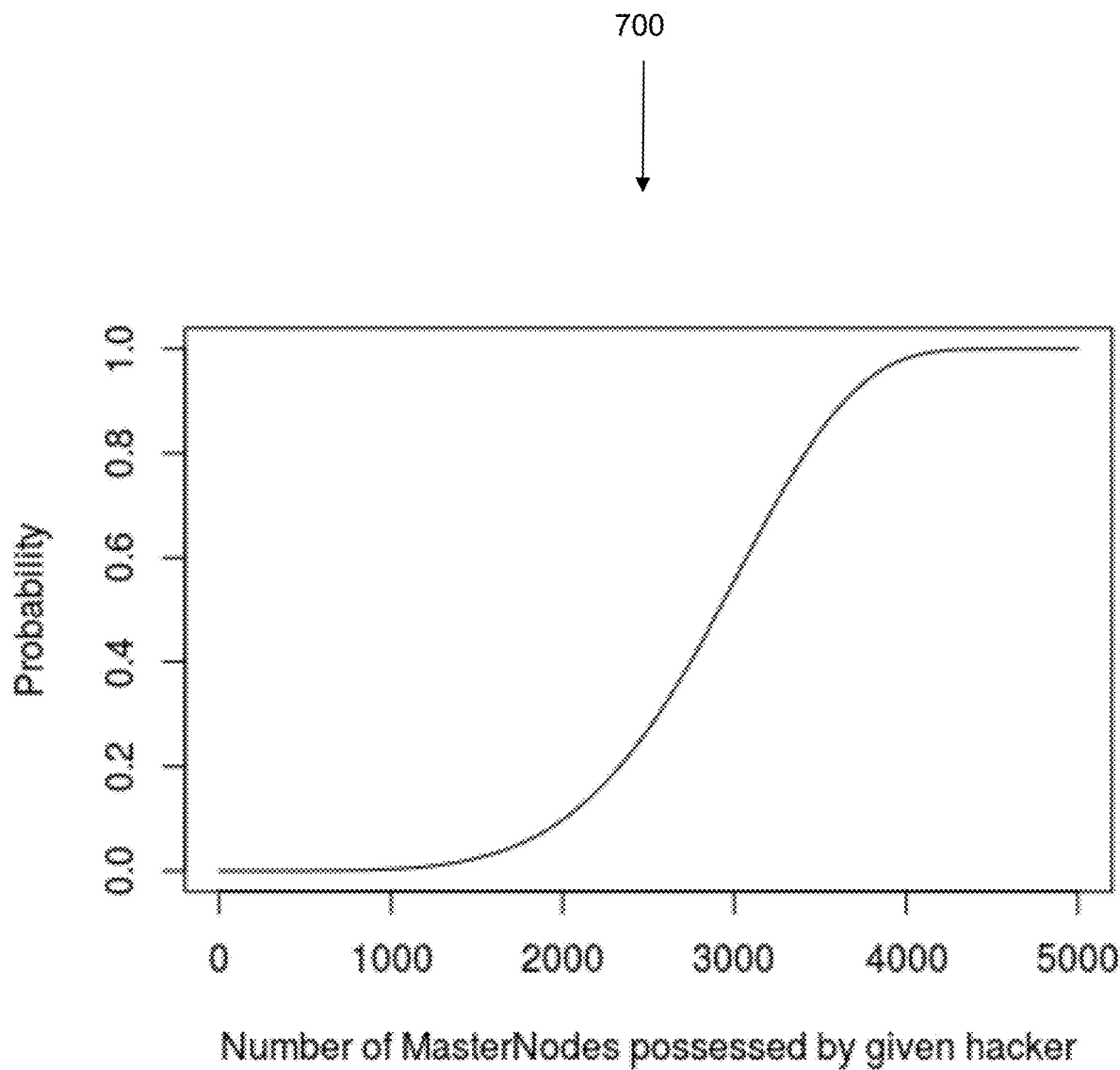
FIG. 7 illustrates another schematic graph plot illustrating the probability of a hacker gaining control over any router of the system of FIG. 1 versus the number of masternodes controlled by a hacker assuming there are 5000 total masternodes.

Referring now also to FIG. 6, a schematic graph plot 600 illustrating the probability of a hacker gaining control over any router of the system 100 versus the number of masternodes controlled by a hacker assuming there are 2500 total masternodes is illustratively shown. For the purposes of graph plot 600, it may be assumed that the total number of graphs on the graph protocol of the system 100 is 50 and the total number of masternodes is 2500. Additionally, for the purposes of graph plot 600, the number of masternodes contained within a router may be 5. The number of masternodes per router may be adjusted based on the security level desired by the creator of the graph and/or by other components of the system 100. FIG. 7 illustrates another schematic graph plot 700 illustrating the probability of a hacker gaining control over any router of the system 100 versus the number of masternodes controlled by a hacker assuming there are 5000 total masternodes. As one can visualize from the graph plots, controlling even 50% of the masternodes would give someone just a 25% chance of gaining control over a single router in the graph.

Figure 8:
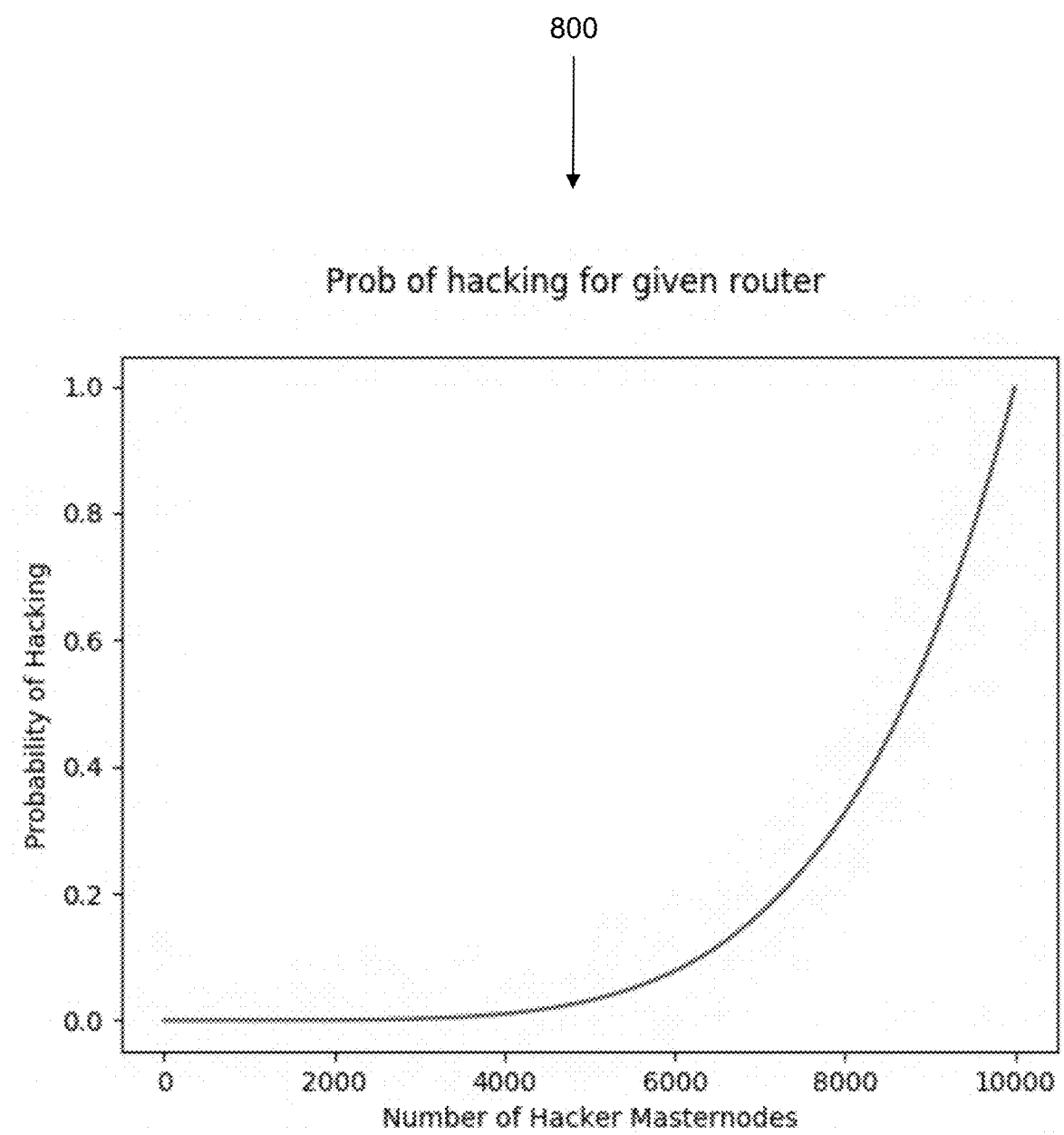
FIG. 8 illustrates yet another schematic graph plot illustrating the quantity of masternodes that a hacker would have to possess in order to have a chance to hack a particular router.
Figure 9:
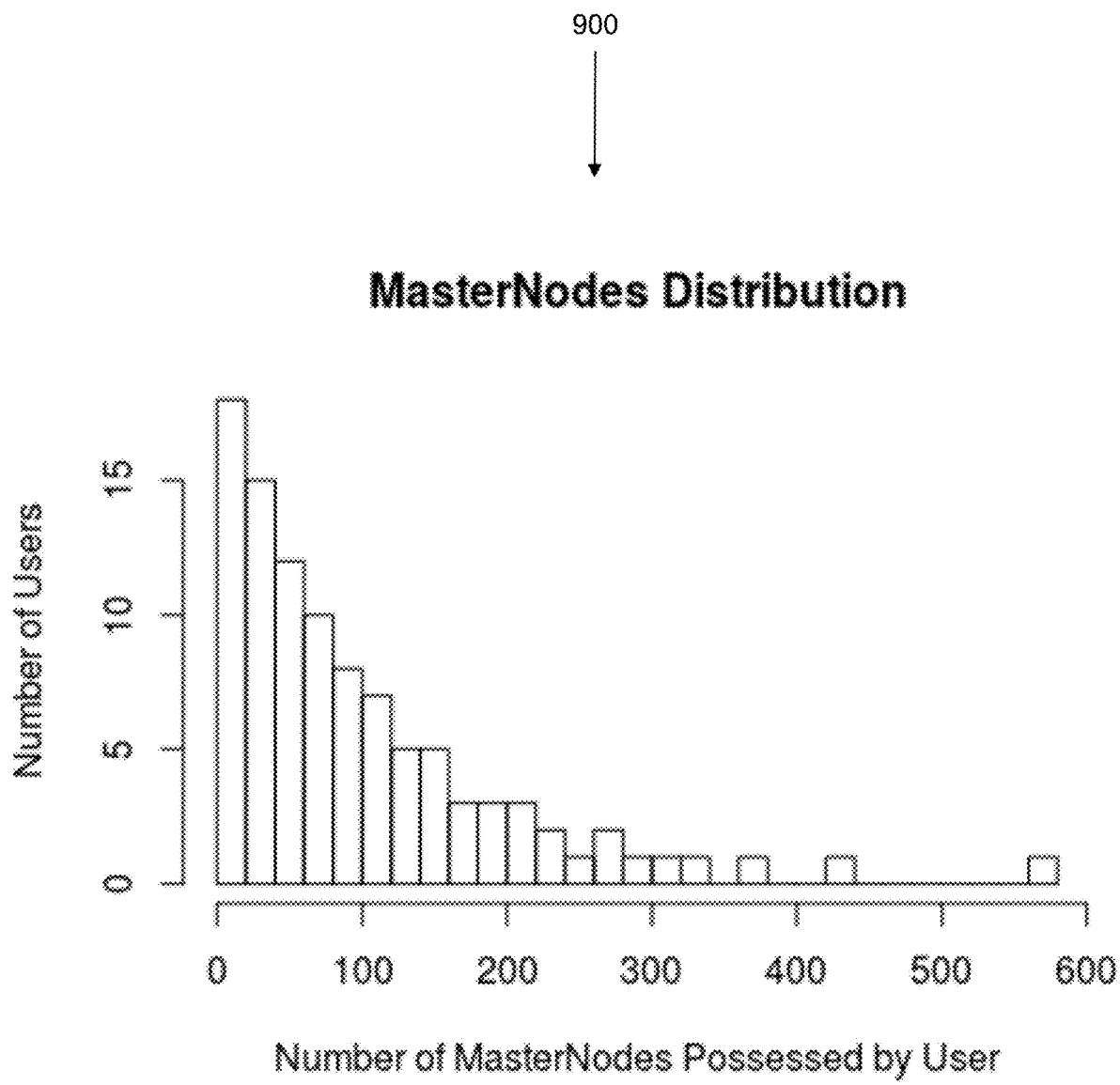
FIG. 9 is a schematic graph plot illustrating an estimated sample distribution of masternodes per user for use with the system of FIG. 1.

In addition to the Sibyl-type attack, another attack scenario may comprise a no-benefit attack. In this attack scenario, the attack scenario may involve a malicious actor trying to disrupt the system 100 at no personal gain or benefit to the actor or to anyone else. In certain embodiments, the least costly way to accomplish this would be to always initialize a conflict resolution vote to plug up or jam the system 100. The system 100 may thwart this issue by damaging the reputation (e.g. reducing the reputation of) of the masternodes that initiated an incorrect conflict. As the reputation is damaged and if the reputation reaches a threshold critically low level, the system 100 may boot the masternode(s) off the graph protocol network (or communications network 135, for example) and the GRP tokens staked by such masternode(s) may be confiscated by the system 100. In addition to the no-benefit attack, the system 100 may experience a given-router attack scenario. In this scenario, a hacker may want to alter a portion of information on a given router, where it may be impossible or useless to add a Sibyl aspect to the attack. In such a scenario, the hacker, therefore, has to control all 5 masternodes within a particular router. Referring now also to FIG. 8, a graph plot 800 illustrating the quantity of masternodes that a hacker would have to possess in order to have a chance to hack a particular router is shown. For the purposes of graph plot 800 and FIG. 8, the assumption was made that the total number of masternodes in the system 100 is 10,000. From the graph plot 800, it can be seen that the probability of this attack happening with control of 50% of all masternodes is roughly 2-3%. In certain embodiments, if the graph is private, the hackers may only be able to destroy information without being able to alter the information because the data is encrypted. Such hackers may be immediately detected by the system 100 since they would no longer be able to produce the correct Merkle-Patricia trees.

In a further attack scenario, the attack scenario may comprise an honest actor turned malicious attack scenario. In such a scenario, the probability that through sheer luck an honest actor (i.e. user) with at least 5 masternodes gains control over a router with his or her digital wallet in it may be calculated. In an attack scenario, the honest actor may be tempted to turn into a hacker and add a few extra GRP tokens to his or her digital wallet. The probability of such an act occurring when there are 5 masternodes per router and 50 graphs in the graph protocol of the system 100 may be 0.000475%. The probability of such an act occurring when there are 5 masternodes per router and 100 graphs in the graph protocol of the system may be 0.000185%. In the event that there are 6 masternodes per router, a simulation was conducted 10,000,000 times and there were a total of zero hacks. The assumed distribution of masternodes per user is plotted in the graph plot 900 of FIG. 9, and may be considered a worst-case scenario with only 100 users controlling all masternodes. In certain embodiments, sample actions that an honest actor turned malicious make take include, but are not limited to, stop responding to queries, stop storing or deleting data, and/or assign him or herself a good reputation (e.g. a reputation above a threshold level and/or a reputation corresponding with a greater amount of privileges in the system). If the user stops responding to queries, the user may detect this fault and alert the main router (e.g. main router 202). If the user stops storing or deleting data, the user may be unable to answer queries and once again the main router may be alerted by the system 100. If the user only assigns him or herself a high level of reputation, this may be more difficult to detect. Nevertheless, if the high level of reputation is assigned a threshold number of times such that it is excessive, this may be detected by other masternodes because if someone has an abnormal amount of power over the system 100 and eventually the disparity between the queries answer and the reputation assigned will be found out by the various components of the system 100. In certain embodiments, the aforementioned actions may result in the masternodes all losing their staked GRP (or other asset) and, therefore, will have a negative economic impact on the so-called honest actor.

Notably, in addition to the system 100 providing security and privacy for the system 100, the system 100 may also provide for query verification capabilities. In the graph protocol of the system 100, masternodes within the same router may verify each other's computation results in order to confirm the accuracy of the results. In order to do so, a three-step verification algorithm for a masternode may be employed by the system 100. In a first step, given a graph G and a security parameter $1^k$, the masternode will output evaluation key $eK_G$ and a verification key $vK_G$: $\{eK_G, vK_G\} \leftarrow$ genkey $(1^k, G)$. In a second step, when a query q is inputted into the system 100, the masternode may output a proof $\pi_q$ and an answer α: $\{\pi_q, \alpha\} \leftarrow$ compute(q, $eK_G$). In the third step, on input $\pi_p$, α, q, the masternode may output 0 or 1: $\{0, 1\} \Delta$ verify $(\pi_q, q, \alpha, vK_G)$. Therefore, the computation performed by the non-verifying masternode is correct if, for graph G, for all k∈N, for $eK_G$, $vK_G$ outputted by genkey $(1^k, G)$, for a query q on G and for all $\pi_q$, α outputted by compute(q, $eK_G$), it returns $1 \leftarrow$ verify $(\pi_p, q, \alpha, vK_G)$. Furthermore, the verification computation determines the query computation to be valid if, for graph G, for all k∈N, for $eK_G$, $vK_G$ outputted by genkey $(1^k, G)$, for any adversary Adv (inverse of the verification algorithm) and for negative binomial distribution neg, the probability $P[\{q, \pi_q \alpha\} \leftarrow F$ Adv($eK_G$, $vK_G$); $1 \leftarrow$ verify $(\pi_q, q, \alpha, vK_G)$; α is incorrect.] ≤neg (k).

In an example scenario where a masternode A has to verify a masternode B's computations, a user may transmit a query q to masternode B. Masternode A may then execute genkey and generate $eK_G$ and $vK_G$. The verification key $vK_G$ may be published for anyone and/or any device in the system 100 to see. Then, masternode B may compute the answer α and proof $\pi_q$ using compute. Masternode A may then verify the validity of response α by executing verify. The size of the proof of a query answer may be proportional to the size of the answer of the query. Then, if masternode A's verification result is 1, this proves the correctness of masternode B's computation results. On the other hand, a third masternode C may intervene and compute the entire query again. A masternode that returns the wrong result or in an untimely fashion may get a decreased reputation score by the system 100. To that end, the system 100 may provide a reputation system. The reputation system utilized by the system 100 may consist of having masternodes verify each other's computation results and provide a score based on the result accuracy and speed. The system 100 may provide for a reputation of beta distribution. In certain embodiments, instead of using a beta function, a computational model of trust and reputation may be utilized. In order to obtain the reputation score for a given masternode, the system 100 may define a Beta density function with parameters α, β:

$$f(p \mid \alpha, \beta) = \frac{\Gamma(\alpha + \beta)}{\Gamma(\alpha) + \Gamma(\beta)} p^{(\alpha-1)}(1-p)^{(\alpha-1)} \quad (1)$$

The expected probability value of the beta distribution may be given by:

$$E(p) = \frac{\alpha}{\alpha + \beta} \quad (2)$$

Assuming a masternode A provides a score of v to masternode B's computation results, the system 100 may transform the computation results with normalization weight w, and return the positive and negative scores:

$$r_B^A = w(1+v)/1 \text{ and } s_B^A = w(1-v)/2 \quad (3)$$

$$\alpha = r_B^A + 1 \text{ and } \beta = s_B^A + 1 \quad (4)$$

Combining the Beta density function equation 1 with equation 4 provides the following:

$$E(p \mid r_B^A, s_B^A) = \frac{r_B^A + 1}{r_B^A + s_B^A + 2} \quad (5)$$

So that the reputation score of B given by A is:

$$Rep(r_B^A, s_B^A) = (E(p \mid r_B^A, s_B^A) - 0.5) * 2 = \frac{r_B^A - s_B^A}{r_B^A + s_B^A + 2} \quad (6)$$

The system 100 may provide for a combined rating. For example, if n masternodes $A_1, A_2, \ldots, A_n$ review masternode B, the reputation score function of B can be represented as Rep(R, S) where:

$$R = r_B^{A_1, A_2, \ldots, A_n} = \sum_{i=1}^{n} r_B^{A_i} \quad (7)$$

$$S = s_B^{A_1, A_2, \ldots, A_n} = \sum_{i=1}^{n} s_B^{A_i} \quad (8)$$

Additionally, the system 100 may provide for discounting. Reputation discounting is a mechanism for giving reviewers with a good reputation a larger weight in the reputation system of the system 100. For example, if a masternode A has a positive score R and negative score S and wishes to score the masternode B with $r_B^A$, and $s_B^A$, the reputation function of B becomes Rep($R_B^A$, $S_B^A$) where:

$$R_B^A = \frac{2R * r_B^A}{(S+2)*(r_B^A + s_B^A) + 2R} \text{ and} \quad (9)$$

$$S_B^A = \frac{2R * s_B^A}{(S+2)*(r_B^A + s_B^A) + 2R} \quad (10)$$

The system 100 may also provide a forgetting mechanism. Notably, past behavior in the system 100 may not always represent current behavior in the system 100. This concept applies to masternodes as well. As a result, the system 100 may utilize a forgetting mechanism. For example, assume a group of masternodes each give a sequence Q containing n scores ($r_{B,i}^Q$, $s_{B,i}^Q$)
The overall scores may be expressed as:

$$r_B^Q = \sum_{i=1}^{n} r_{B,i}^Q \text{ and } s_B^Q = \sum_{i=1}^{n} r_{B,i}^S. \quad (11)$$

By introducing the forget factor λ (0<λ<1) into the expression (11), the following results:

$$r_B^Q = \sum_{i=1}^{n} r_{B,i}^Q \lambda^{n-i} \text{ and } s_B^Q = \sum_{i=1}^{n} r_{B,i}^S \lambda^{n-i} \quad (12)$$

Thus, when λ=1, the expression is identical to the one without the forget factor. When λ=0, only the most recent score counts. Whereas, when (0<λ<1), recent reviews gain accrue a bigger weight in the reputation score calculation.

In addition to the foregoing, the system 100 may also include a learning engine 170. The learning engine 170 may be comprised of software, hardware, or a combination thereof, and may be supported by any suitable machine learning and/or artificial intelligence algorithms. The learning engine 170 may be a system that determines patterns and/or associations with respect to requests received by the system 100, features and functionality of artificially-intelligent routers (i.e. agents), or a combination thereof. In certain embodiments, a learning engine 170 may be contained within some or all of the artificially-intelligent routers (i.e. agents), however, in certain embodiments, the learning engine 170 may reside in any separate area and/or device of the system 100 or even external network 165. The learning engine 170 may allow for improved efficiency and accuracy of the system 100, while enabling the routers to perform self-optimization of their various functional features, create indices, reorganize ownership of graph components, determine optimal new representations for subgraphs associated with routers, implement changes to the routers and/or subgraphs, create requests, and/or perform any other operative functionality provided by the system 100 and methods disclosed herein. In certain embodiments, the learning engine 170 may train or improve any router, modify and/or replace an algorithm utilized by a router, optimize the assignment of incoming requests to the appropriate corresponding router by a main router or other component of the system 100, improve the efficiency at which requests are processed by routers (and masternodes), improve the selection of which masternodes should be utilized to perform which tasks, improve any operative functionality provided by the system 100 and/or methods, or a combination thereof.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving bid requests to generate a graph; receiving ask requests from one or more masternodes; determining if requirements of a bid request match requirements of an ask request; selecting masternodes to service a bid request; selecting and arranging masternodes to form a router to service a bid request; generating graphs on the graph protocol network; selecting main routers for tracking subgraphs of a graph and corresponding assigned routers and masternodes; receiving queries intended for the graph protocol network; providing queries to a main router for analysis; selecting masternodes to execute the query; executing the queries; providing results obtained based on executing the queries; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates specific example configurations of the various components of the system 100, the system 100 may include any configuration of the components, which may include using a greater or lesser number of the components. For example, the system 100 is illustratively shown as including a first user device 102, a second user device 111, a communications network 135, a server 140, a server 150, a server 160, and a database 155. However, the system 100 may include multiple first user devices 102, multiple second user devices 111, multiple communications networks 135, multiple servers 140, multiple servers 150, multiple servers 160, multiple databases 155, or any number of any of the other components inside or outside the system 100. Similarly, the system 100 may include any number of artificially-intelligent routers (i.e. agents), any number of main routers, any number of masternodes, any number of tasks, any number of graph databases, any number of graphs, any number of subgraphs, any number of any other component, program, or device of the system 100, or a combination thereof. In certain embodiments, substantial portions of the functionality and operations of the system 100 may be performed by other networks and systems that may be connected to system 100. In certain embodiments, the system 100 may operate in a multi-threaded environment with multiple instances of each module, program, and/or component of the system 100 operating in parallel. Such parallel operations may be limited, in certain embodiments, by predetermined limits, performance metrics and statistics, hardware availability, user interfaces, external interfaces, and access limitations associated with the system 100 and/or database 155.

Figure 10:
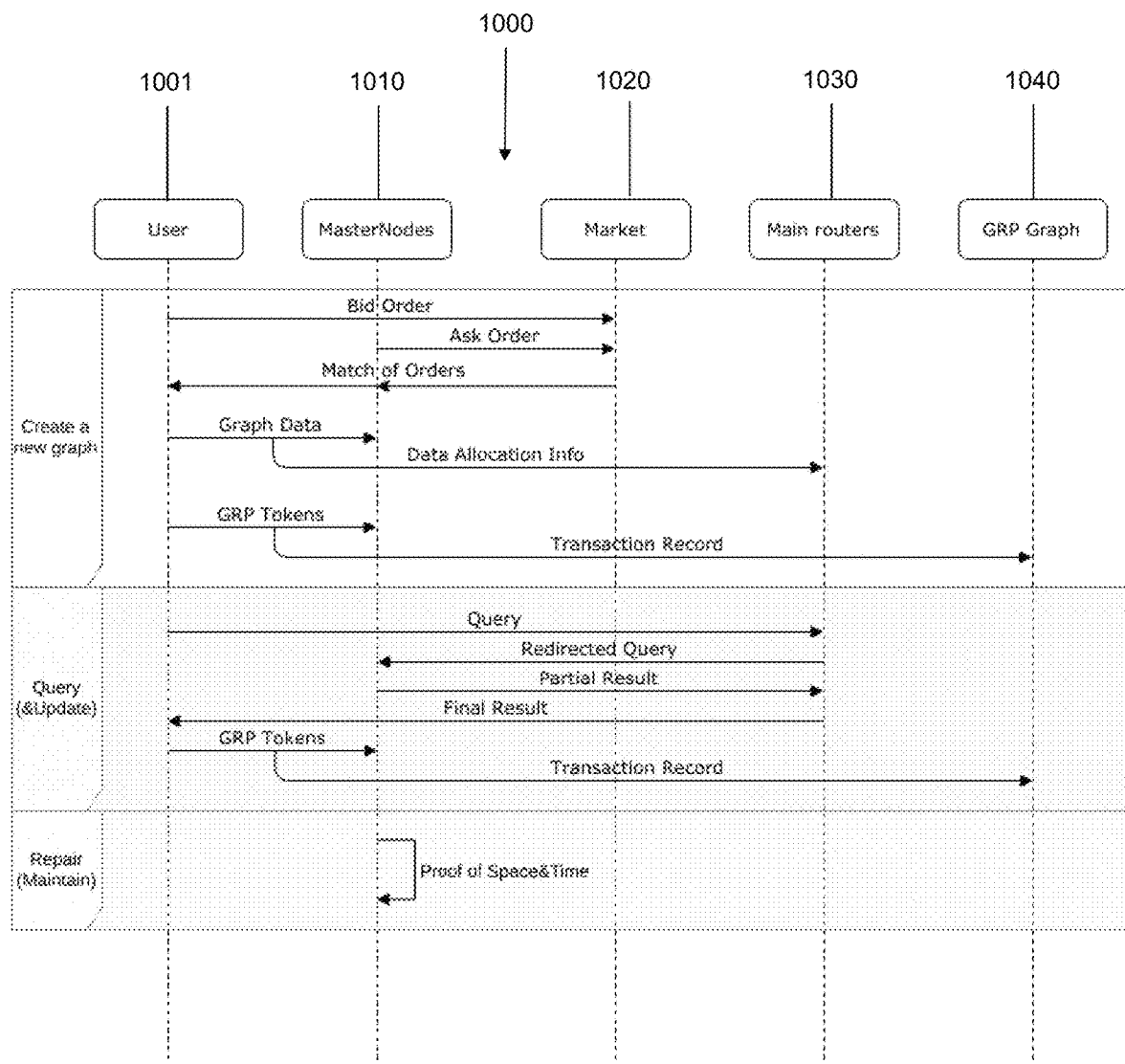
FIG. 10 is a flow diagram illustrating a sample method for creating a new graph, processing queries, conducting updates, and conducting repairs and/or maintenance according to an embodiment of the present disclosure.

As shown in FIG. 10, an exemplary method 1000 for creating new graphs, processing queries, updating graphs, and/or repair and/or maintain graphs is schematically illustrated. In FIG. 10, the first portion (i.e. top) of the method 1000 dedicated to creating a new graph is illustrated on the top of FIG. 10, the second portion (i.e. middle) of the method 1000 dedicated to performing queries and/or updates is illustrated in the middle of FIG. 10, and the third portion (i.e. bottom) of the method 100 dedicated to conducting repairs and/or maintenance on graphs is illustrated at the bottom of FIG. 10. In the first portion of the method 1000, a user 1001 can submit a bid order (i.e. bid request) to generate a graph on a graph protocol network of the system 100, such as by utilizing the first user device 102. The bid order may also include metadata including, but not limited to, a pay per hour per megabyte of storage, an identification of a quantity of masternodes that should be in a router (i.e. to adjust security and replication) to generate the graph, a minimum amount of storage capacity needed for the graph, a minimum amount of computational power needed for the graph (e.g. processing resources and/or other types of computational power resources), whether the graph is to be private or public, the type of payment currency to be used, the required stake amount, and/or a base fee for queries related to the graph. The user 1001 may submit the bid order using a user device (e.g. first user device 102), which may be sent to a graph protocol market 1020 of the graph protocol network. The graph protocol market 1020 may be an exchange, marketplace, and/or other location where bid requests may be received, ask requests may be received, a comparison of bid requests and ask requests may be conducted, where fees are recorded and/or tracked, where transactions may occur, and/or any combination thereof. After the bid request is received at the graph protocol market 1020 (or at any other time), one or more masternodes 1010 may submit an ask order (i.e. ask request) to the graph protocol market 1020 of the graph protocol network. The ask order may specify metadata including, but not limited to, a desired pay per hour per megabyte, hardware specifications for the masternode(s), software specifications for the masternode(s), an identification of maximum storage capacity, a preference for either public or private graphs, a maximum stake allowed, desired payment currencies for servicing the request, and/or any other information.

Once the bid order(s) and ask order(s) are received, the graph protocol market 1020 may analyze the bid order and ask order to determine if the requirements of the bid order match and/or are compatible with the requirements specified in the ask order. If the graph protocol market 1020 determines that the requirements of the bid order and the ask order match, the graph protocol market 1020 may transmit notifications to the masternode(s) 1010 and the user 1001 (via a user device, such as first user device 102) indicating that the masternode(s)' 1010 requirements match the bid order's requirements and that the masternode(s) 1010 may be utilized to service the bid request and generate the graph. The user 1001, such as via the user device, may transmit graph data for use in generating the graph associated with the bid order to the masternode(s) 1010 so that the graph may be generated by the masternode(s) 1010. In certain embodiments, the user 1001, such as via the user device, may transmit the graph data for use in generated the graph directly to the main router 202, which can then forward the graph data to the appropriate masternode(s) 1010. In certain embodiments, the masternode(s) 1010 utilizing the graph data to generate the graph may be arranged into routers. The arrangements of the masternode(s) 1010 into routers may be performed by any device, program, function, and/or system of system 100. For example, the arrangements may be conducted by the main router 202 and/or the servers 140, 150, 160. In certain embodiments, each router may store a single subgraph (i.e. a portion of the graph) of the graph, and each subgraph may contain a set of vertices, along with their corresponding edges. The vertices may represent entities (e.g. individuals or anything that a business may want to track) and the edges may represent relationships and/or transactions between vertices in the graph. Each router may be connected to other routers of the graph protocol network via the edges that originate in one subgraph of the graph and end in another subgraph of the graph. In certain embodiments, the subgraphs may be stored utilizing the RDF framework as described elsewhere in the present disclosure.

The user 1001 may pay the fee specified in the bid order by using a corresponding amount of GRP tokens ("GRP" may be the symbol of the unique cryptographic token utilized by the graph protocol network) (or other digital asset). In certain embodiments, GRP tokens may be the native currency of the graph protocol network. In certain embodiments, the GRP tokens may be the default payment mechanism of the graph protocol network for fees and costs of all kinds on the graph protocol. The GRP tokens may be regulated and managed through a graph (i.e. the GRP graph 1040) of its own, which may be based on the graph protocol. In certain embodiments, the supply of GRP tokens may be non-inflationary and may initially distributed via an initial coin offering. In certain embodiments, sixty percent (or other desired percentage) of the tokens may go to private sale investors and crowdsale participants. The remaining percentage of GRP tokens may be utilized by the owners and/or controllers of the system 100 for its team, partners, advisors, and an ecosystem fund, whose purpose may be to spur the grown and mainstream adoption of the graph protocol. In addition to the user 1001 paying the fee using GRP tokens, the masternode(s) 1010 may also be required to stake a certain amount or percentage of the total supply of GRP tokens in the graph protocol network in order to participate in the storage and computation of graphs, queries, and/or other actions associated with a graph of the graph protocol network. For example, each masternode 1010 may be required to stake 0.01% (or other amount) of the total supply of GRP tokens (e.g. the total supply may be 1,000,000,000 GRP tokens and the amount to stake would be 100,000 GRP tokens) when submitting an ask order to participate in servicing the bid order, to generate the graph, and/or to execute queries received from the user 1001. In certain embodiments, any stake percentage may be utilized and/or any number of GRP tokens may be staked.

The masternode(s) 1010 may proceed to generate the graph associated with the bid request. In certain embodiments, each router and its corresponding masternode(s) 1010 may generate a separate subgraph forming a portion of the entire graph. In certain embodiments, each masternode 1010 within a router may store the subgraph generated by the masternode(s) 1010 within the router. In certain embodiments, data allocation information associated with the graph and/or the subgraphs of the graph may be provided to one or more main routers 1030 to which the masternode(s) 1010 are assigned. For example, data allocation information relating to how the data is stored in the graph, in subgraphs, in the masternode(s) 1010, and/or the routers may be provided to the main routers 1030 so that the main routers 1030 can track and monitor the masternode(s) 1010, the routers that include the masternode(s) 1010, the subgraphs of the graph stored in the masternode(s) 1010 and routers, and/or the entire graph itself. In certain embodiments, the main routers 1030 may be selected based on a vote by one or more of the masternode(s) 1010 after creation of the graph or at another desired time. In certain embodiments, transaction records corresponding to the staking and providing of GRP tokens associated with the bid orders and/or ask orders may be provided to and/or stored on the GRP graph 1040 so that a transaction history may be compiled and regularly updated in the system 100.

In certain embodiments, instead of using GRP tokens, an alternate form of currency may be utilized with the system 100. For example, any suitable cryptocurrency (or other currency) may be utilized with the system 100 and may include, but is not limited to, Bitcoin, Ethereum, Litecoin, Bitcoin cash, Ripple XRP, any other cryptocurrency, any other currency, any other asset, or a combination thereof. In certain embodiments, GRP tokens may be utilized in addition to one or more other suitable currencies and/or cryptocurrencies. In further embodiments, the amount of currency to required be staked in the system 100, such as by the masternode(s) 1010 or other components of the system 100, may be adjusted in real-time or at selected times. In certain embodiments, as the total amount of available currency changes, the system 100 may adjust the amount of currency to be required to be staked to participate in the various processes of the system 100 and/or methods disclosed in the present disclosure or otherwise.

Once the graph has been created by the masternode(s) 1010 of one or more routers of the graph protocol system and referring now also to the middle portion of FIG. 10, the user 1001 (or another user) may make queries associated with the graph generated on the graph protocol network, updates to the graph generated on the graph protocol network, and/or perform other actions with respect to the graph generated on the graph protocol network. For example, the user 1001 may desire to seek information associated with a particular financial transaction stored in a subgraph of the graph previously generated by the graph protocol network. The user 1001 (or other users with permissions to make queries) can issue a query using the user device to the graph protocol network for the information. In certain embodiments, the query may include a graph identifier that identifies the graph that the query is associated with, information indicating what the query is for, a fee amount (e.g. GRP token to be paid), and/or any other desired information. The query may be sent from the user device of the user 1001 to the main router 1030 for analysis and/or review. The main router 1030 may analyze the query to determine which routers and/or masternodes 1010 should be utilized to process the query. For example, based on the information in the query, the main router 1030 may determine which subgraph of the graph is associated with the query and which masternode(s) 1010 and routers generated and/or store the subgraph. Once the main router 1030 determines which routers and/or masternodes 1010 should process the query, the main router 1030 may redirect the query to the appropriate routers and masternodes 1010. As each of the masternodes 1010 of the router process the query, the masternodes 1010 may transmit each of their results (which may be partial results of the query) to the main router 1030. Once the main router 1030 has received and aggregated all of the results from the masternode(s) 1010, the main router 1030 may transmit the aggregated final result to the user device of the user 1001 so that the user 1001 may review the final result of the query. In certain embodiments, the fee paid by the user 1001 for making the query may be recorded in a transaction record for storage on the GRP graph 1040.

In the third portion (i.e. the bottom portion) of FIG. 10, the method 1000 may include facilitating maintenance and/or repairs in graphs of the graph protocol network. In certain embodiments, for a desired period of time, masternode(s) 1010 within the same router may provide to each other a proof, such as, but not limited to, a proof of Spacetime, such as proofs defined in Filecoin, a proof using Zk Snarks, proof of data replication, any other proof, or a combination thereof. The masternode(s) 1010 may also provide each of their three Merkle-Patricia tree roots to each other. The Merkle-Patricia tree roots may serve as proof to the graph protocol network that a particular masternode 1010 is storing the correct subgraph of the graph. If a conflict arises and is detected by the system 100 and a masternode 1010 claims that one (or more) of the other masternodes 1010 is storing faulty data for its subgraph, the system 100 may initiate a conflict resolution vote and resolve the conflict as described in the present disclosure. Notably, the method 1000 may further incorporate any of the features and functionality described for the system 100, any system, the method 1100, any other method described herein, or as otherwise described herein.

Figure 11:
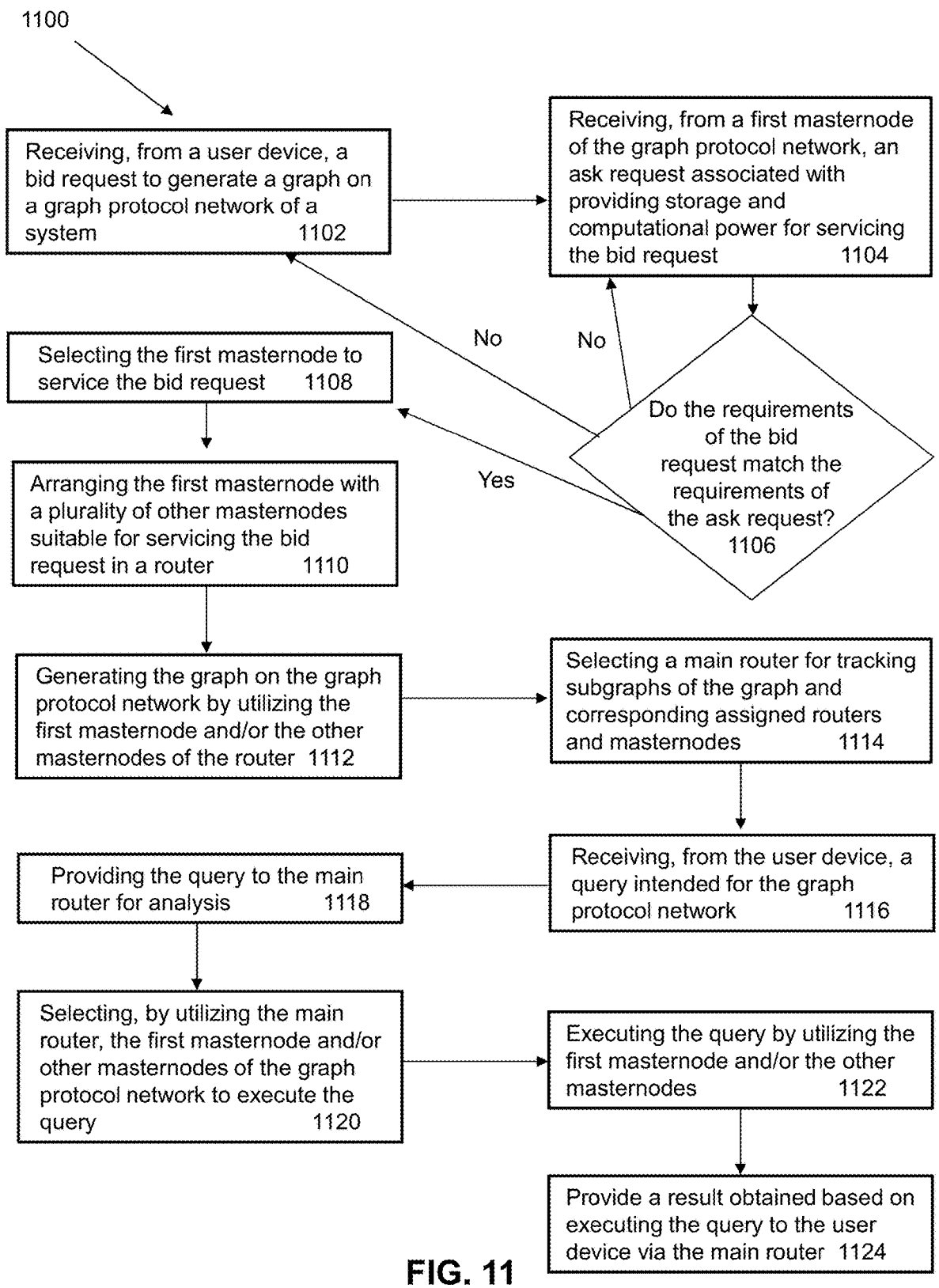
FIG. 11 is a flow diagram illustrating a sample method for providing a graph protocol for forming a decentralized and distributed graph database according to an embodiment of the present disclosure.

As shown in FIG. 11, an exemplary method 1100 for providing a graph protocol for forming a decentralized and distributed graph database is schematically illustrated. For the purposes of method 1100, a user, such as first user 101, or a device, such as first user device 102, may be interested in generating a graph for inclusion in database 155, providing an update to an existing graph of database 155, querying a graph of database 155, performing any other operation, or any combination thereof. At step 1102, the method 1100 may include receiving, from a user device (e.g. first user device 102), a bid request to generate a graph on a graph protocol network of a system, such as system 100. In certain embodiments, the bid request may include information, requirements, and/or metadata including, but not limited to, an amount of pay per hour per megabyte (or other storage metric) of storage for storing a graph associated with the bid request, a quantity of masternodes that should be in a router that services the bid request (e.g. to adjust security and replication), a minimum storage capacity needed for the graph associated with the bid request, an indication of whether the graph is to be public or private, an indication of a base fee for queries associated with the graph, any other desired information, or a combination thereof. In certain embodiments, the receiving of the bid request may be performed and/or facilitated by utilizing the first user device 102, the second user device 111, the server 140, the server 150, the server 160, the communications network 135, the main router 202, routers 210, 215, 220, 402, 404, 406, any masternode, any combination thereof, or by utilizing any other appropriate program, network, system, or device. At step 1104, the method 1100 may include receiving, such as from a first masternode of the graph protocol network of the system 100, an ask request. In certain embodiments, the ask request may indicate storage, computational power, capabilities of the first masternode, any other information associated with the first masternode, or a combination thereof. The ask request may be a request by the first masternode to service the bid request provided by the user device in step 1102, and may specify requirements including, but not limited to, a desired pay per hour per megabyte (or other storage amount) for the graph, hardware specifications for the first masternode, maximum storage capacity for the first masternode, a preference for either public or private graphs, any other information, or a combination thereof. In certain embodiments, the receiving of the ask request may be performed and/or facilitated by utilizing the first user device 102, the second user device 111, the server 140, the server 150, the server 160, the communications network 135, the main router 202, routers 210, 215, 220, 402, 404, 406, any masternode, any combination thereof, or by utilizing any other appropriate program, network, system, or device.

At step 1106, the method 100 may include determining whether the requirements of the bid request match and/or are compatible with the requirements of the ask request. In certain embodiments, the determining may be performed and/or facilitated by utilizing the first user device 102, the second user device 111, the server 140, the server 150, the server 160, the communications network 135, the main router 202, routers 210, 215, 220, 402, 404, 406, any masternode, any combination thereof, or by utilizing any other appropriate program, network, system, or device. If, at step 1106, the requirements of the bid request do not match and/or are not compatible with the requirements of the ask request, the method 1106 may proceed back to step 1104 and continue to receive bid requests until a bid request matches the ask request. In certain embodiments, if, at step 1106, the requirements of the bid request do not match and/or are not compatible with the requirements of the ask request, the method 1100 may go back to step 1104 and either receive another ask request from the first masternode or receive another ask request from a different masternode until the requirements match. If, at step 1106, the requirements of the bid request do match and/or are compatible with the requirements of the ask request, the method 1100 may proceed to step 1108. At step 1108, the method may include selecting the first masternode to service the bid request. In certain embodiments, the selecting may be performed and/or facilitated by utilizing the first user device 102, the second user device 111, the server 140, the server 150, the server 160, the communications network 135, the main router 202, routers 210, 215, 220, 402, 404, 406, any masternode, any combination thereof, or by utilizing any other appropriate program, network, system, or device.

At step 1110, the method 1100 may include arranging the first masternode with one or more other masternodes that have been determined to be suitable for servicing the bid request into a router. For example, if a second and third masternode have been determined by the system 100 to have ask requests that match the requirements of the bid request from the user device, the second and third masternodes may be grouped with the first masternode to form a router that may service the bid request. In certain embodiments, the arranging of the masternodes into the router may be performed and/or facilitated by utilizing the first user device 102, the second user device 111, the server 140, the server 150, the server 160, the communications network 135, the main router 202, routers 210, 215, 220, 402, 404, 406, any masternode, any combination thereof, or by utilizing any other appropriate program, network, system, or device. Once the masternodes are arranged into a router for servicing and/or processing the bid request, the method 1100 may proceed to step 1112. At step 1112, the method 1100 may include generating the graph on the graph protocol network by utilizing at least one of the masternodes of the router. In certain embodiments, the masternodes of the router may generate all of the graph, however, in other embodiments, the masternodes of the router may be configured to generate a subgraph of the graph. In the event that the masternodes of the router generate a subgraph of the graph, other masternodes belonging to other routers can generate the remaining subgraph or subgraphs of the graph so that that entire graph is generated. In certain embodiments, the generating of the graph may be performed and/or facilitated by utilizing the first user device 102, the second user device 111, the server 140, the server 150, the server 160, the communications network 135, the main router 202, routers 210, 215, 220, 402, 404, 406, any masternode, any combination thereof, or by utilizing any other appropriate program, network, system, or device.

Once the graph is generated at step 1112, the method 1100 may include, at step 1114, selecting a main router (e.g. main router 202) for tracking subgraphs of the graph, along with routers and masternodes assigned to generate, maintain, and/or store the subgraphs of the graph. In certain embodiments, the main router may be selected after the graph is created and the routers are chosen to generate the graph. In certain embodiments, the selection of the main router may be performed and/or facilitated by utilizing the first user device 102, the second user device 111, the server 140, the server 150, the server 160, the communications network 135, the main router 202, routers 210, 215, 220, 402, 404, 406, any masternode, any combination thereof, or by utilizing any other appropriate program, network, system, or device. In certain embodiments, the main router may be selected by utilizing verifiable delay functions in order to create a fair and secure voting process to select the main router. In the event that a malicious adversary attempts to manipulate the outcome of the voting process to select the main router, such as by refusing to participate after determining other masternodes' vote selections, this may force the voting process to restart until he or she (or a device) obtains the desired voting outcome for the main router. In order to counteract such a situation, the method 1100 may utilize verifiable delay functions, which may include the following steps/activities: (1) a Setup function may be utilized to generate a puzzle with a given difficulty and may output a verification and an evaluation key. In certain embodiments, each masternode participating in the vote may start by running the Setup function with a given difficulty. (2) an Eval function may be utilized to take the evaluation key and an input, and may output a number and a proof. In certain embodiments, the input may be the vote(s) made by a masternode(s). (3) a Verify function may be utilized to take an input, an output (the number generated by the Eval function), and the proof, and may then output a Boolean value. Once all masternodes have voted for a main router, they can run the Verify function on another masternode's Eval output number and proof to verify their vote. Such a process may be utilized to thwart potential malicious users and/or devices from manipulating voting outcomes.

At step 1116, the method 1100 may include receiving, from the user device, a query intended for the graph protocol network. In certain embodiments, the query made by the user device to the graph protocol network may include a Graph identifier (ID) that identifies the particular graph to be queried, the actual query itself (e.g. information to be obtained that is associated with the graph), and/or a fee amount for the query. In certain embodiments, the query may be received and/or facilitated by utilizing the first user device 102, the second user device 111, the server 140, the server 150, the server 160, the communications network 135, the main router 202, routers 210, 215, 220, 402, 404, 406, any masternode, any combination thereof, or by utilizing any other appropriate program, network, system, or device. At step 1118, the method 1100 may include providing the query to the main router (e.g. main router 202) for analysis. The main router may analyze the query to determine which masternodes and/or routers should execute the query. For example, the determining may be based on the computational power and storage capabilities of the masternodes and/or routers, whether the query seeks information from a graph generated and/or stored by certain masternodes and/or routers, based on the fee amount for the query, based on any factor, or any combination thereof. In certain embodiments, the providing of the query and/or the analyzing of the query may be performed and/or facilitated by utilizing the first user device 102, the second user device 111, the server 140, the server 150, the server 160, the communications network 135, the main router 202, routers 210, 215, 220, 402, 404, 406, any masternode, any combination thereof, or by utilizing any other appropriate program, network, system, or device.

Once the main router has analyzed the query at step 1118, the method 1100 may include, at step 1120, selecting, based on the analysis, the first masternode, other masternodes, and/or routers of the graph protocol network to execute the query. In certain embodiments, the selecting may be performed and/or facilitated by utilizing the first user device 102, the second user device 111, the server 140, the server 150, the server 160, the communications network 135, the main router 202, routers 210, 215, 220, 402, 404, 406, any masternode, any combination thereof, or by utilizing any other appropriate program, network, system, or device. At step 1122, the method 1100 may include executing the query by utilizing the first masternode, other masternodes, and/or routers. In certain embodiments, the executing of the query may be performed and/or facilitated by utilizing the first user device 102, the second user device 111, the server 140, the server 150, the server 160, the communications network 135, the main router 202, routers 210, 215, 220, 402, 404, 406, any masternode, any combination thereof, or by utilizing any other appropriate program, network, system, or device. Once the query has been executed, the method 1100 may include providing, at step 1124, one or more results obtained based on the executing of the query to the user device. For example, the first masternode, the other masternodes, and/or the routers may provide a result obtained from execution of the query to the main router, which may then forward the result to the user device for review and analysis. Notably, the method 1100 may further incorporate any of the features and functionality described for the system 100, any system, the method 1000, any other method described herein, or as otherwise described herein.

The systems and methods disclosed herein may include additional functionality and features. For example, when users (or devices or programs) need to modify data (e.g. by performing an INSERT, UPDATE, DELETE, and/or other operation) stored in a given graph, the masternodes may change all replicates of the data within a router in an identical fashion, create a new Merkle-Patricia tree hash root and broadcast it to the other graph routers in the system 100. In certain embodiments, if a subgraph exceeds a certain predetermined size, a new bid may be automatically placed on the graph protocol market to form a new router. In certain embodiments, users, programs, and/or devices with the right permissions can make queries to the graph protocol by providing a request including a graph identifier that identifies the graph, a query associated with the graph, and a fee amount for making the query. The request/query may be sent to the graph's main router 202 and redirected to the appropriate regular routers 210, 215, 220 from there. In further embodiments, masternodes within the same router may provide to each other a proof, such as a proof of spacetime (or other proof), and their given three Merkle-Patricia tree roots. This will also serve as proof to the system that a masternode is storing the correct subgraph on their machine (i.e. the machine supporting the masternode's functionality). If a conflict arises and a masternode claims one of the other masternodes is storing faulty and/or corrupt data, a conflict resolution vote may be initiated and resolved in a manner similar to the voting processes described in the present disclosure.

The systems and methods disclosed herein may include further functionality and features. For example, in terms of token economics and as indicated above, the graph protocol may have its own native token, the GRP token (or other desired currency) and masternodes may be required to stake a certain percentage of the total supply of GRP tokens in order to participate in the storage and computation of graphs and queries. In certain embodiments, the controllers of the system 100 (or other desired entities or individuals) may charge a transaction fee for requests to generate graphs, queries, and/or other actions conducted in the system 100. In certain embodiments, minimal (or other) transaction fees may be charged for a variety of reasons. For example, fees may be charged in order to avoid denial of service (DoS) attacks and distributed DoS (DDoS) attacks. Typically, such attacks may aim to flood the graph protocol network with a large amount of small transactions. If the attacker has to pay a sufficient fee for all transactions, this type of attack may become economically infeasible for the attacker. As another example of why fees may be charged in the system 100, masternodes should be compensated for their storage and computational power utilized for various functionality of the system 100—such as storage and computation power utilized to generate graphs and/or process queries. The graph protocol ecosystem (e.g. system 100) may also require a steady stream of revenue in order to fight the high convexity problem and sustain its ongoing graph and distributed ledger technology development. In certain embodiments, transaction fees may be divided into two parts: BaseFee= (Stake*5%)/(TransactionCount) where, Stake is the masternode GRP tokens held in escrow and TransactionCount is the number of transactions on the graph protocol over the past selected period of time (e.g. 7 days, for example). In certain embodiments, a scenario where the graph protocol network could be overloaded with transaction requests may be taken into account. In such a scenario, users may be required to pay a premium fee to obtain priority in the queue. The total fee for the transaction in such a scenario may be: TotalFee=BaseFee+PremiumFee where, Premium Fee is the arbitrary amount paid to gain priority in the processing sequence.

In addition to the transaction fees described above, query fees may also be utilized with the system 100, which are also described in preceding sections of the present disclosure. For users and/or potentially devices and/or programs that may make queries in the system 100, the base fee for each query may be BaseFee=(Stake*5%)/(QueryCount+ C*Complexity) where, Stake is the amount of masternode GRP tokens that are held in escrow in the system 100, QueryCount is the number of queries on the graph protocol over a selected period of time (e.g. 7 times), C is the constant base fee in GRP tokens, and Complexity is the type and/or amount of computational steps. As with the preceding example, a scenario where the graph protocol network could be overloaded with transaction requests may be taken into account. In such a scenario, users may be required to pay a premium fee to obtain priority in the queue. The total fee for the transaction in such a scenario may be: TotalFee=BaseFee+PremiumFee where, Premium Fee may be the arbitrary amount paid to gain priority in the processing sequence. In certain embodiments, a certain percentage of fees may be contributed to those controlling the system 100 (e.g. 10%) for the future development of the graph protocol and/or for other reasons. The remaining percentage of fees may be awarded to the masternodes for their time, effort, and computational power expended to process queries, generate graphs, and/or perform other actions in the system 100. The system 100 may also incorporate storage fees. Storage fees may be determined upon the creation of a particular graph and may be distributed frequently (e.g. at a periodic basis or other desired interval). In certain embodiments, the controllers of the system 100 may take a percentage cut from the storage fees in order to continue the development of graph algorithms and other cryptographic research associated with the system. In further embodiments, incentives for contributing to the development of a graph (e.g. adding information, conducting curation, or other actions) may be agreed upon and calculated according to the entity managing the graph in the system 100. In certain embodiments, GRP tokens may be distributed from an escrow, to which anyone and/or any device may contribute.

Notably systems and methods disclosed herein may include still further functionality and features. For example, the graph protocol generated and supported by the system 100 may address enterprise solution and existing distributed ledger technology problems and/or issues. In certain embodiments, user data may be replicated and encrypted on masternodes across the system 100 and/or the entire world. Users, devices, and/or programs may be able to modify permissions using a private key and as long as the key is kept secure, such as by utilizing two-factor authentication and/or other security measures, such users, devices, and/or programs may have direct access to their data by querying the masternodes of the system 100. In order to destroy, alter, and/or encrypt data and as described elsewhere herein, a hacker would have to take possession of a very large number of masternodes to have a small chance of gaining control over even a single router. Such attacks on the graph protocol would be either economically unviable and/or technically impossible. Notably, the systems and methods facilitate data and knowledge sharing in a seamless manner on the graph protocol network. Like many current blockchain and directed acyclic graph technologies, the graph protocol provided by the system 100 and methods is censorship resistant since the data may be hosted across the world and users may have unfiltered access to the graph protocol network via queries (i.e. with a small masternode fee to pay). The graph protocol network also has an incentivization aspect. For example, companies and/or individuals attempting to create a knowledge graph revolving around a given theme with information that is difficult to forge (e.g. that is Sybil-attack resistant and/or comprises medical history and/or financial statements) can incentivize users to contribute their own data to graph by rewarding them with digital assets.

The systems and methods disclosed herein may also assist in optimizing costs. Transparency may help users understand where their fees are going and how they are allocated in the system 100, for example. Since a lot of the masternodes performing storage and computations might not otherwise be using their equipment to their full potential, the margins can be a lot lower than companies that use dedicated data cents. Additionally, the costs associated with storing and querying graphs can be covered by multiple entities (e.g. masternodes and/or routers), which encourages the sharing of knowledge and data. In certain instances, companies and/or individuals can pool their money and/or other resources together for an incentivization escrow, split storage costs in an even way (or other desired manner), and/or simply share and add their own data to a graph of the system 100. With regard to problems and/or issues associated with existing distributed ledger technologies, the graph protocol provided by the systems and methods tackles such problems and/or issues by taking on the structure and format of graph databases. This not only drastically improves the ease of data manipulation and its efficiency, but also enables a greater number of users that still have difficulties understanding distributed ledger technologies to participate in the industry and create applications with real world value and mainstream applicability.

Notably, the systems and methods may be utilized in conjunction with many types of uses cases in addition to the ones described in the present disclosure. For example, the systems and methods may be utilized for use cases presented by cloud graph database solutions, such as, but not limited to, social networking, recommendation engines, fraud detection, knowledge graphs, life sciences data processing, network operations, information technology, big data, any other type of area, or a combination thereof. In certain embodiments, an exemplary use case involves cryptocurrency exchange and stablecoin anti-money laundering services. Each trader involved may be represented as a vertex and their corresponding transactions may be represented as edges to other vertices with information, such as, but not limited to, who is the maker and taker, the amounts exchanged in the transaction, the prices associated with the transaction, any other information, or a combination thereof. The exchange may continuously query the graph for suspicious trading patterns and facilitate real-time money laundering and/or fraud detection. Notably, there has been at least 2.5 billion dollars laundered in Bitcoin alone and exchanges are searching for new solutions to this problem. Since the market is so fragmented that many exchanges are small and do not have sufficient resources to scale quickly, this is why only a proportional amount of masternodes would be allocated to them, making the barrier to entry extremely low. Since the fees may be paid with digital assets, such as Bitcoin or other cryptocurrencies, there is no need to convert the cryptocurrency exchanges' earnings to FIAT to pay for the hosting and querying services. Furthermore, a network effect for cryptocurrency exchanges may be achieved by utilizing the systems and methods. Independently, it is hard to track money laundering, but if all exchanges contribute some data, criminals may be caught even when switching platforms. Also, exchanges may encrypt data that the contribute and the masternodes running the AML algorithms on it would be able to detect suspicious patterns without having to read the underlying data and invading exchanges' user privacy protocols. In certain embodiments, the graph protocol provided by the systems and methods may be utilized to create a semantic decentralized internet.

The systems and methods disclosed herein may include yet further functionality and features. For example, the operative functions of the system 100 and methods may be configured to execute on a special-purpose processor specifically configured to carry out the operations provided by the system 100 and methods. Notably, the operative features and functionality provided by the system 100 and methods may increase the efficiency of computing devices that are being utilized to facilitate the functionality provided by the system 100 and methods. For example, the system 100 and methods can optimize the performance of future actions through machine learning, such as those conducted by the artificially-intelligent agents and/or routers, such that a reduced amount of computer operations need to be performed by the devices in the system 100 using the processors and memories of the system 100 than in systems that are not capable of machine learning as described in this disclosure. In such a context, less processing power may need to be utilized because the processors and memories do not need to perform actions, operations, and analyses that have already been conducted by the system 100. As a result, the functionality provided by the system 100 and methods 1000, 1200 may provide substantial savings in the usage of computer resources by utilizing the software and functionality provided in the present disclosure.

Notably, in certain embodiments, various functions and features of the system 100 and methods may operate without human intervention and may be conducted entirely by computing devices, robots, programs, and/or processes. For example, in certain embodiments, multiple computing devices may interact with devices of the system 100 to provide the functionality supported by the system 100. Additionally, in certain embodiments, system 100 may operate continuously to reduce the possibility of defects, conflicts, and/or errors from being introduced into the system 100, the graph databases, and/or the artificially-intelligent agents (e.g. routers). In certain embodiments, the system 100 and methods may also provide effective computing resource management by utilizing the features and functions described in the present disclosure. For example, in certain embodiments, the system 100 may specify a quantity of computer processor resources (e.g. processor clock cycles, processor speed, processor cache, etc.) that may be dedicated to receiving bid requests to generate a graph; receiving ask requests from one or more masternodes; determining if requirements of a bid request match requirements of an ask request; selecting masternodes to service a bid request; selecting and arranging masternodes to form a router to service a bid request; generating graphs on the graph protocol network; selecting main routers for tracking subgraphs of a graph and corresponding assigned routers and masternodes; receiving queries intended for the graph protocol network; providing queries to a main router for analysis; selecting masternodes to execute the query; executing the queries; providing results obtained based on executing the queries; and performing any other operations conducted by the system 100, or any combination thereof. As another example, the system 100 may indicate a quantity of processor cycles of a processor that may be utilized to obtain data, process obtained data, and/or specify a selected amount of processing power that may be dedicated to editing the graph databases of the system 100, updating the graph databases of the system 100, obtaining data from the graph databases of the system 100, inputting data into the graph databases of the system 100, utilizing the artificially-intelligent agents of the system 100, performing any operation of the system 100 and/or methods described in the present disclosure, or a combination thereof.

In certain embodiments, any device or program in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and method 500 at time periods when usage of processing resources and/or memory resources in the system 100 is at a selected and/or threshold value. In certain embodiments, the system 100 and methods may include transmitting signals to the memory devices utilized in the system 100, which indicate which specific portions (e.g. memory sectors, etc.) of the memory should be utilized to store any of the data utilized or generated by the system 100 and/or the database 155. For example, a signal may be transmitted to the memory devices indicating which portions of the memories should be dedicated to storing data generated based on the processing of data by the system, storing data learned by the system 100, storing algorithms utilized by the system 100, storing graphs generated and/or updated by the system 100, storing any other information generated and/or stored by the system 100, or a combination thereof. Notably, the signals transmitted to the processors and memories may be utilized to optimize the usage of computing resources while executing the operations conducted by the system 100. As a result, such features provide substantial operational efficiencies and improvements over existing technologies.

Figure 12:
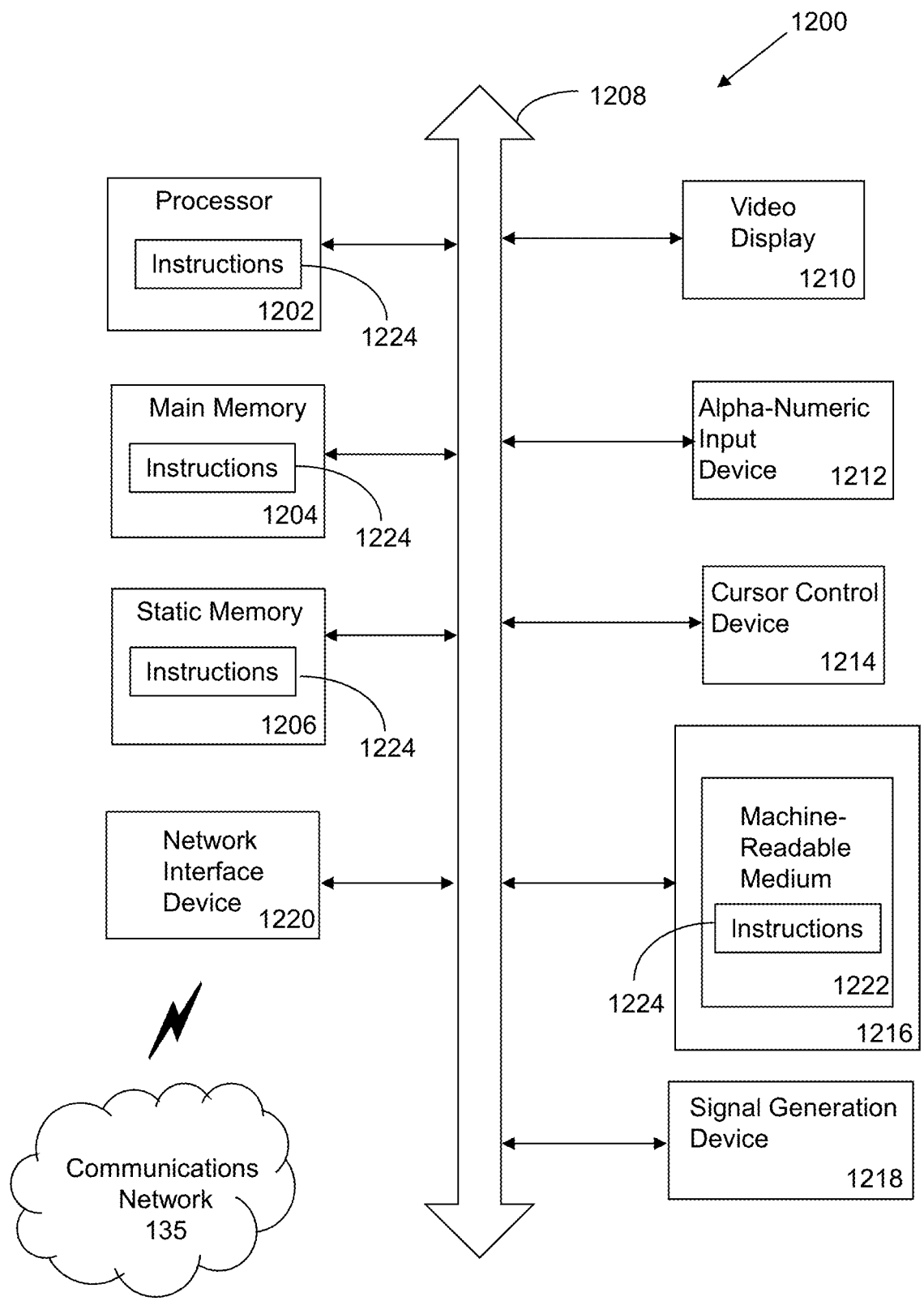
FIG. 12 is a schematic diagram of a machine in the form of a computer system within which a set of instructions, when executed, may cause the machine to perform any one or more of the methodologies or operations of the systems and methods for providing a graph protocol for forming a decentralized and distributed graph database.

Referring now also to FIG. 12, at least a portion of the methodologies and techniques described with respect to the exemplary embodiments of the system 100 can incorporate a machine, such as, but not limited to, computer system 1200, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the server 140, the server 150, the database 155, the server 160, or any combination thereof. The machine may assist with operations performed by the artificially-intelligent agents (e.g. routers 210, 215, 220, 402, 404, 406, etc.), the main router 202, the masternodes 211, 212, 213, 216, 217, 218, the graph databases provided in the present disclosure, any software application of the system 100, any other component in the system 100, any programs in the system 100, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1200 may include a processor 1202 (e.g., a central processing unit (CPU), a graphics processing unit (GPU, or both)), a main memory 1204 and a static memory 1206, which communicate with each other via a bus 1208. The computer system 1200 may further include a video display unit 1210, which may be, but is not limited to, a liquid crystal display (LCD), a flat panel, a solid state display, or a cathode ray tube (CRT). The computer system 1400 may include an input device 1212, such as, but not limited to, a keyboard, a cursor control device 1214, such as, but not limited to, a mouse, a disk drive unit 1216, a signal generation device 1218, such as, but not limited to, a speaker or remote control, and a network interface device 1220.

The disk drive unit 1216 may include a machine-readable medium 1222 on which is stored one or more sets of instructions 1224, such as, but not limited to, software embodying any one or more of the methodologies or functions described herein, including those methods illustrated above. The instructions 1224 may also reside, completely or at least partially, within the main memory 1204, the static memory 1206, or within the processor 1202, or a combination thereof, during execution thereof by the computer system 1200. The main memory 1204 and the processor 1202 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1222 containing instructions 1224 so that a device connected to the communications network 135, another network, or a combination thereof, can send or receive voice, video or data, and communicate over the communications network 135, another network, or a combination thereof, using the instructions. The instructions 1224 may further be transmitted or received over the communications network 135, another network, or a combination thereof, via the network interface device 1220.

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system for implementing a graph protocol, comprising:
 a memory that stores instructions; and
 a processor that executes the instructions to perform operations, the operations comprising:
  receiving, from a user device, a bid request to generate a graph on a graph protocol network of the system, wherein the bid request contains first metadata identifying a first set of requirements associated with the graph of the bid request;
receiving, from a first masternode of the graph protocol network, an ask request associated with providing storage and computational power for servicing the bid request, wherein the ask request contains second metadata identifying a second set of requirements associated with the ask request;
determining if the first set of requirements of the bid request from the user device match the second set of requirements of the ask request from the first masternode;
arranging the first masternode and a plurality of other masternodes into a router of the graph protocol network;
generating, if the first set of requirements match the second set of requirements, the graph on the graph protocol network by utilizing at least the first masternode of the router of the graph protocol network;
facilitating selection of a main router off the graph protocol network after generating the graph, wherein the main router tracks a plurality of routers of the graph protocol network including the router; and
utilizing at least one verifiable delay function to create a voting process utilized by the first masternode to select the main router.

2. The system of claim 1, wherein the operations further comprise requiring the first masternode to stake a percentage of a total supply of graph protocol tokens or other digital in order for the first masternode to utilize the storage and computational power for servicing the bid request, to check on another masternode within the router, execute a query or an update for the graph associated with the user device, or a combination thereof.

3. The system of claim 1, wherein the operations further comprise rewarding a user of the user device with a portion of the graph protocol tokens if data for use in the graph is supplied by the user.

4. The system of claim 1, wherein the operations further comprise receiving, at the main router of the graph protocol network, a query from the user device that is intended for the graph protocol, wherein the query includes a graph identifier, a fee amount associated with the query, a decryption key for decrypting encrypted data, or a combination thereof.

5. The system of claim 4, wherein the operations further comprise redirecting the query from the main router to the router containing the first masternode for processing by the first masternode, wherein the operations further comprise obtaining a result generated based on processing the query at the first masternode, and wherein the operations further comprise providing the result to the user device via the main router.

6. The system of claim 1, wherein the operations further comprise dividing the graph into a plurality of subgraphs, wherein the operations further comprise assigning a first subgraph of the plurality of subgraphs to the router for management, and wherein the operations further comprise assigning other subgraphs of the plurality of subgraphs to other routers of the graph protocol network.

7. The system of claim 6, wherein the operations further comprise automatically placing, if a subgraph of the plurality of subgraphs exceeds a predetermined size, a new bid on the graph protocol market associated with the graph protocol to form a new router.

8. The system of claim 1, wherein the at least one verifiable delay function comprises a setup function that creates a puzzle with a selected difficulty and outputs a verification and an evaluation key, wherein the at least one verifiable delay function comprises an eval function that utilizes the evaluation key and an input comprising a vote from the first masternode to output a number and a proof, wherein the at least one verifiable delay function comprises a verify function that utilizes the input, the number, and the proof to output a Boolean value.

9. The system of claim 8, wherein the operations further comprise executing, after a plurality of masternodes including the first masternode has voted in the voting process to select the main router, the verify function on numbers and proofs outputted by the plurality of masternodes to verify votes of the plurality of masternodes.

10. The system of claim 1, wherein the operations further comprise separating the graph into a plurality of subgraphs, wherein each subgraph contains a set of vertices with a corresponding set of edges, wherein the operations further comprise enabling the router to store a first subgraph of the plurality of subgraphs, and wherein the operations further comprise connecting the router to other routers in the graph protocol network via an edge of the set of edges that originates in the first subgraph and ends in a second subgraph of the plurality of subgraphs.

11. The system of claim 1, wherein the first metadata identifying the first set of requirements associated with the bid request comprises information indicating a pay per hour per megabyte of storage for the graph, a quantity of masternodes to be contained in the router, a minimum storage capacity needed for the graph, an identification of whether the graph is to be public or private, a minimum amount of computational power needed for the graph, a base fee for a query associated with the graph, a type of payment currency to be utilized, a required stake amount, or a combination thereof.

12. The system of claim 1, wherein the second metadata identifying the second set of requirements associated with the ask request comprises information indicating a desired pay per hour per megabyte of graph data for the graph, a hardware specification, a software specification, a maximum storage capacity for the graph, an identification of a preference for the graph to be public or private, a desired payment currency, a maximum stake allowed, or a combination thereof.

13. The system of claim 1, wherein the operations further comprise enabling the first masternode of the router to provide a proof to a second masternode of the router and vice versa, wherein the operations further comprise enabling the first masternode of the router to provide at least one Merkle-Patricia tree root to the second masternode and vice versa, wherein the operations further comprise utilizing the proof and the at least one Merkle-Patricia tree root to confirm that the first masternode and the second masternode are storing the correct corresponding subgraphs of the graph.

14. The system of claim 13, wherein the operations further comprise detecting whether a conflict exists based on the proof and the at least one Merkle-Patricia tree root, and wherein the operations further comprise initiating a conflict resolution vote to resolve the conflict.

15. A method for implement a graph protocol, comprising:
receiving, from a user device, a bid request to generate a graph on a graph protocol network of the system, wherein the bid request contains first metadata identifying a first set of requirements associated with the graph of the bid request;
receiving, from a first masternode of the graph protocol network, an ask request associated with providing storage and computational power for servicing the bid request, wherein the ask request contains second metadata identifying a second set of requirements associated with the ask request;

determining, by utilizing instructions from a memory that are executed by a processor, if the first set of requirements of the bid request from the user device match the second set of requirements of the ask request from the first masternode;

arranging the first masternode and a plurality of other masternodes into a router of the graph protocol network;

generating, if the first set of requirements match the second set of requirements, the graph on the graph protocol network by utilizing at least the first masternode of the router of the graph protocol network, and receiving, from the user device, a request to modify the graph;

facilitating the first masternode and other masternodes of the router to change all data replicated within the router in an identical manner;

generating a new Merkle-Patricia tree hash root; and broadcasting the new Merkle-Patricia tree hash root to other routers of the graph protocol network.

16. The method of claim 15, further comprising:
selecting a main router for tracking a subgraph of the graph, the router, the first masternode, the other masternodes, or a combination thereof.

17. The method of claim 15, further comprising:
storing a router Merkle-Patricia tree in the first masternode that contains first leaf nodes containing vertices of a subgraph of the graph stored in the first masternode and an adjacency list of edges corresponding to the vertices;
storing a graph Merkle-Patricia tree in the first masternode that contains second leaf nodes that comprise hash roots of the router Merkle-Patricia tree;
storing a Merkle-Patricia tree of the graph protocol that contains third leaf nodes that are hash roots of the graph Merkle-Patricia tree, or storing a combination thereof.

18. The method of claim 15, further comprising:
receiving, from the user device and at a main router of the graph protocol network, a transaction intended for the graph;
providing, via the main router, the transaction to the router;
determining, via the first masternode and other masternodes of the router, whether the transaction is valid by analyzing a Merkle-Patricia tree;
updating, if the transaction is valid, a subgraph of the first masternode and subgraphs of the other masternodes based on the transaction;
updating, if the transaction is valid, Merkle-Patricia tree of the first masternode and the other masternodes based on the transaction;
broadcasting the Merkle-Patricia tree to masternodes of other routers of the graph protocol network; and
determining, during a vote resolution conflict, which masternodes are storing correct graph data.

19. The method of claim 15, further comprising:
receiving, from the user device, a query intended for the graph;
determining if keys to adjust encryption layers are to be provided to the first masternode before executing the query;
adjusting, if the keys are to be provided to the first masternode, the encryption layers after providing the keys to the first masternode;
rewriting the query to an encrypted format;
transmitting the encrypted query to the first masternode for execution;
executing the encrypted query by utilizing the first masternode;
obtaining an encrypted result based on executing the encrypted query; and
facilitating decryption of the encrypted result by the user device.

20. A non-transitory computer-readable device comprising instructions, which when loaded and executed by a processor, cause the processor to perform operations comprising:
receiving, from a user device, a bid request to generate a graph on a graph protocol network of the system, wherein the bid request contains first metadata identifying a first set of requirements associated with the graph of the bid request;
receiving, from a first masternode of the graph protocol network, an ask request associated with providing storage and computational power for servicing the bid request, wherein the ask request contains second metadata identifying a second set of requirements associated with the ask request;
determining if the first set of requirements of the bid request from the user device match the second set of requirements of the ask request from the first masternode;
arranging the first masternode and a plurality of other masternodes into a router of the graph protocol network;
generating, if the first set of requirements match the second set of requirements, the graph on the graph protocol network by utilizing at least the first masternode of the router of the graph protocol network;
receiving, from the user device, a query intended for the graph;
determining if keys to adjust encryption layers are to be provided to the first masternode before executing the query;
adjusting, if the keys are to be provided to the first masternode, the encryption layers after providing the keys to the first masternode;
rewriting the query to an encrypted format;
transmitting the encrypted query to the first masternode for execution;
executing the encrypted query by utilizing the first masternode;
obtaining an encrypted result based on executing the encrypted query; and
facilitating decryption of the encrypted result by the user device.

21. The non-transitory computer-readable device of claim 20, wherein the operations further comprise generating a reputation score for the first masternode and the plurality of other masternodes, wherein the reputation score is adjusted based on an accuracy of a computation result, based on a speed of a computation result, based on involvement with a conflict, based on involvement in an attack, based on voting, based on whether a proof of spacetime returns a correct result, or a combination thereof.

22. The non-transitory computer-readable device of claim 20, wherein the operations further comprise enabling the first masternode and the plurality of other masternodes to generate an update for the graph, update a Merkle-Patricia tree of the first masternode and the plurality of other masternodes, provide a proof of spacetime to confirm storage of a correct subgraph on a machine, utilizing a verifiable delay function, querying encrypted data, assign reputation scores to the masternodes of the router, interact with other routers, communicate with routers, vote in a conflict, or a combination thereof.

* * * * *